US005978894A

United States Patent [19]
Sukegawa et al.

[11] Patent Number: 5,978,894
[45] Date of Patent: Nov. 2, 1999

[54] METHOD OF INTERPROCESSOR DATA TRANSFER USING A NETWORK, VIRTUAL ADDRESSES AND PAGING, A BUFFER, FLAGS, DATA TRANSFER STATUS INFORMATION AND USER ACCESSIBLE STORAGE AREAS IN MAIN MEMORY

[75] Inventors: Naonobu Sukegawa; Masanao Ito, both of Kokubunji; Yoshiko Tamaki, Kodaira, all of Japan

[73] Assignee: Hitachi, Ltd., Tokyo, Japan

[21] Appl. No.: 08/757,997

[22] Filed: Nov. 27, 1996

[30] Foreign Application Priority Data

Nov. 27, 1995 [JP] Japan .................................. 7-307713

[51] Int. Cl.[6] .................................................... G06F 12/00
[52] U.S. Cl. ........................ 711/203; 707/204; 395/200.3
[58] Field of Search ............................ 395/200.3, 200.56, 395/200.73, 674, 680; 707/204; 711/203

[56] References Cited

U.S. PATENT DOCUMENTS

| | | | |
|---|---|---|---|
| 4,395,757 | 7/1983 | Bienuenu et al. | 395/674 |
| 4,694,396 | 9/1987 | Weisshaar et al. | 395/200.3 |
| 5,222,217 | 6/1993 | Blount et al. | 707/204 |
| 5,386,566 | 1/1995 | Hamanaka et al. | 395/680 |
| 5,572,680 | 11/1996 | Ikeda et al. | 395/200.73 |
| 5,659,777 | 8/1997 | Iwasaki et al. | 395/200.56 |

FOREIGN PATENT DOCUMENTS

| | | |
|---|---|---|
| 4-291660 | 10/1992 | Japan . |
| 6-110845 | 4/1994 | Japan . |
| 6-324998 | 11/1994 | Japan . |
| 2271006 | 3/1994 | United Kingdom . |

OTHER PUBLICATIONS

"Architectural Support in the PUT/GET Interferface for Parallelizing Compiler and Parallel Programs," Proceedings of Parallel processing symposium JSPP'94, pp. 233–240, May, 1994.

Primary Examiner—John W. Cabeca
Assistant Examiner—David Langjahr
Attorney, Agent, or Firm—Antonelli, Terry, Stout & Kraus, LLP

[57] ABSTRACT

To realize interprocessor data transfer with the data receive area not fixed in the real memory and with less overhead for synchronization, the send node sends to the destination node, data, a virtual address of a receive area, an address of a receive control flag, a comparison value, and a comparison method. Network adaptor in the destination node judges whether the transfer condition is fulfilled, based on the comparison value, the comparison method and the semaphore in the receive control flag designated by the receive control flag address. Network adaptor further detects whether the receive area of the virtual address is in the main storage, based on the virtual address and the address translation table. The send data is stored in the receive buffer provided in the area for OS, when the above-mentioned condition is not fulfilled or the receive area is not in the main storage. Either when the destination node program issues a specific system call or when the program issues a reading instruction to the data in the receive area and a page fault is generated, OS moves the send data from the receive buffer to the receive area.

28 Claims, 13 Drawing Sheets

170 RECEIVE CONTROL REGISTER

- 1310 RECEIVE PACKET TYPE
- 1320 SOURCE NODE NUMBER
- 1330 PROCESS NUMBER
- 1340 ADDRESS OF SEND FLAG
- 1350 TRANSFER DATA LENGTH
- 1360 ADDRESS OF RECEIVE CONTROL FLAG
- 1370 COMPARISON VALUE
- 1380 COMPARISON METHOD
- 1390 ADDRESS OF RECEIVE AREA
- 1400 ADDRESS OF RECEIVE FLAG

32bit

▨ ···RESERVED

80 TABLE CONTROL REGISTER

1510 ADDRESS OF ADDRESS TRANSLATION TABLE

▨ ···RESERVED

32bit

FIG. 8
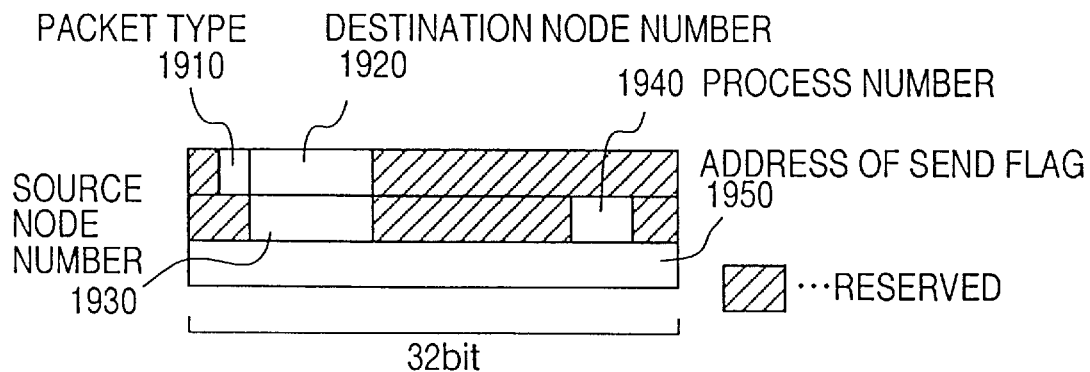
PACKET TYPE 1910
DESTINATION NODE NUMBER 1920
1940 PROCESS NUMBER
SOURCE NODE NUMBER 1930
ADDRESS OF SEND FLAG 1950
▨ ···RESERVED
32bit
FIG. 9
330 RECEIVE CONTROL FLAG
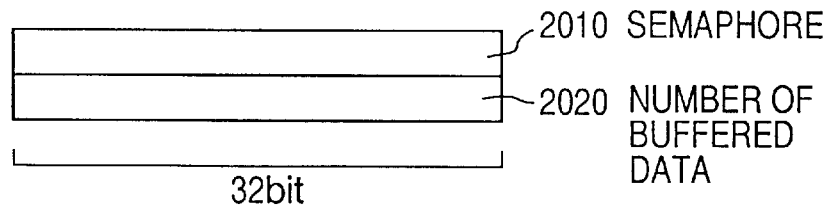
2010 SEMAPHORE
2020 NUMBER OF BUFFERED DATA
32bit
FIG. 10
| COMPARISON METHOD | U | = | ≠ | < | ≦ | > | ≧ |
|---|---|---|---|---|---|---|---|
| COMPARISON METHOD VALUE | 111 | 001 | 110 | 100 | 101 | 010 | 011 |
U···UNCONDITIONAL WRITE

FIG. 11

| PACKET TYPE | DATA TRANSFER | RECEIVE ACKNOWLEDGE | BUFFERING ACKNOWLEDGE |
|---|---|---|---|
| PACKET TYPE VALUE | 00 | 01 | 10 |

FIG. 12

110 SEND FLAG

| STATE | BEFORE TRANSMISSION | TRANSFER STARTED | SEND COMPLETED/ BEFORE STORE OF RECEIVED DATA | SEND COMPLETED/ STORE TO BUFFER COMPLETED | SEND COMPLETED/ STORE TO RECEIVE AREA COMPLETED |
|---|---|---|---|---|---|
| FLAG VALUE | 0000 | 0001 | 0010 | 0110 | 1010 |

FIG. 13

320 RECEIVE FLAG

| STATE | BEFORE RECEIVING | STORING TO BUFFER | STORING TO RECEIVE AREA | STORE TO BUFFER COMPLETED | STORE TO RECEIVE AREA COMPLETED |
|---|---|---|---|---|---|
| FLAG VALUE | 0000 | 0011 | 0001 | 0110 | 0100 |

FIG. 18

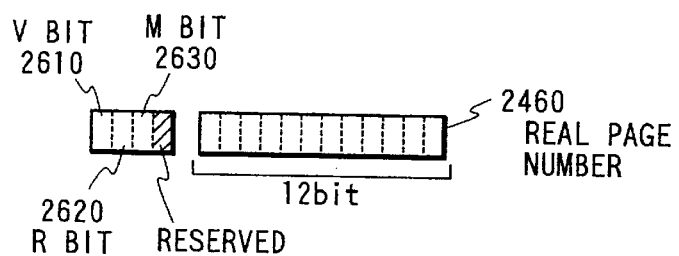

FIG. 19

| BIT NAME | VALUE | MEANING |
|---|---|---|
| V BIT | 1 | ACCESS OF THE PAGE SHOWN BY THE ENTRY IS PERMITTED |
| V BIT | 0 | ACCESS OF THE PAGE SHOWN BY THE ENTRY IS PROHIBITED |
| R BIT | 1 | PAGE SHOWN BY THE ENTRY IS FIXED ON MAIN STORAGE |
| R BIT | 0 | PAGE SHOWN BY THE ENTRY IS CONTROLLED AS VIRTUAL STORAGE |
| M BIT | 1 | PAGE SHOWN BY THE ENTRY EXISTS IN MAIN STORAGE |
| M BIT | 0 | PAGE SHOWN BY THE ENTRY EXISTS ON THE EXTERNAL STORAGE DEVICE |

PUT(TRANSFER DATA LENGTH, —————— 2710
        SEND AREA START ADDRESS, —————— 2720
        ADDRESS OF SEND FLAG, —————— 2730
        DESTINATION PROCESSOR NUMBER, —— 2740
        ADDRESS OF RECEIVE CONTROL FLAG, — 2750
        COMPARISON VALUE, —————— 2760
        COMPARISON METHOD, —————— 2770
        RECEIVE AREA START ADDRESS, —————— 2780
        ADDRESS OF RECEIVE FLAG) —————— 2790

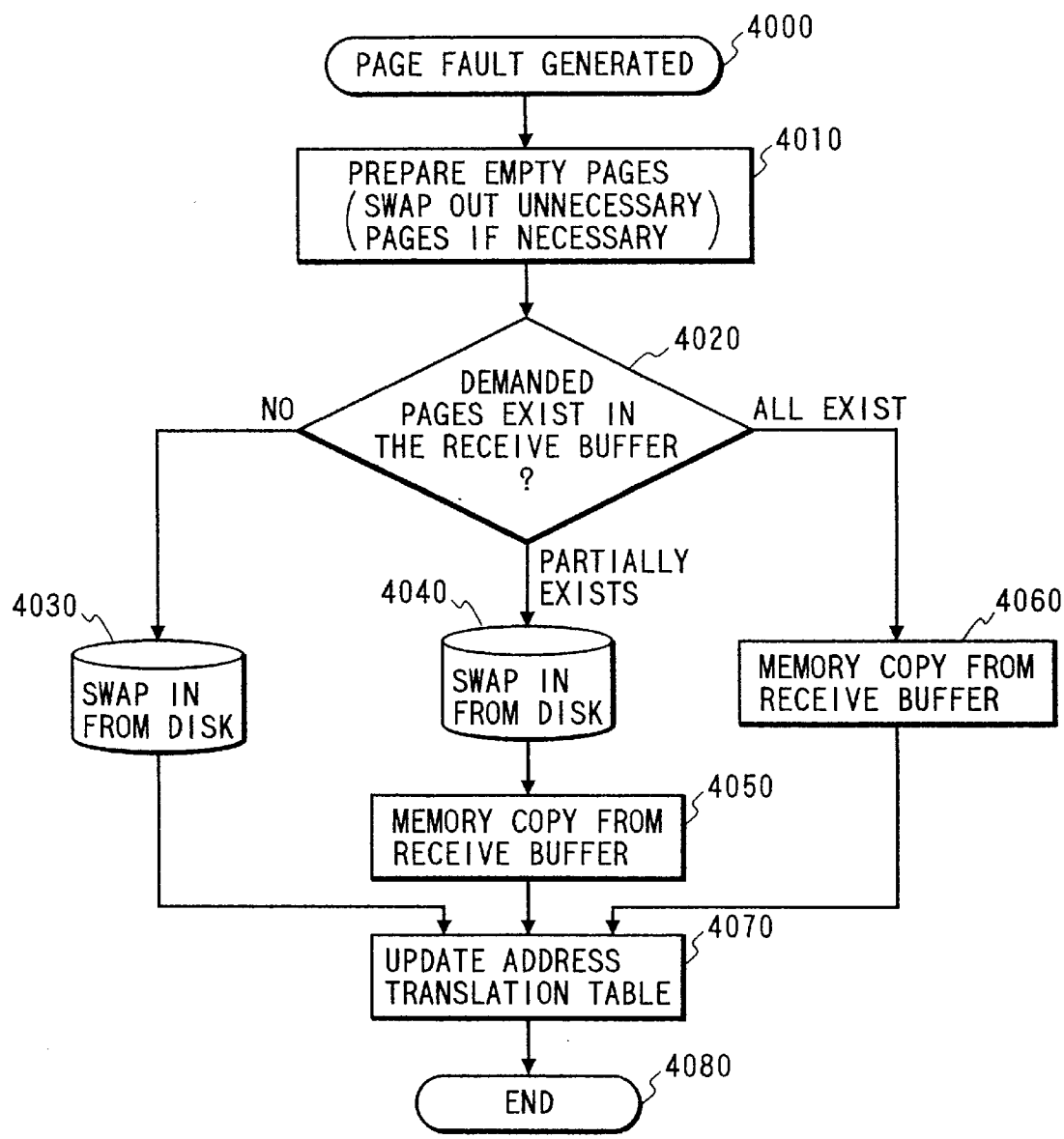

METHOD OF INTERPROCESSOR DATA TRANSFER USING A NETWORK, VIRTUAL ADDRESSES AND PAGING, A BUFFER, FLAGS, DATA TRANSFER STATUS INFORMATION AND USER ACCESSIBLE STORAGE AREAS IN MAIN MEMORY

BACKGROUND OF THE INVENTION

The present invention relates to a data transfer method in a computer system having a data transfer network, plural nodes each having at least one processor and a computer system suitable therefore.

In the parallel computer system, speeding up of interprocessor data transfer leads to increased speed of the entire system. There are two factors which determine the performance of the interprocessor data transfer: (1) data transfer rate and (2) transfer latency. Transfer latency is an overhead of hardware and the software processing needed to start the data transfer. When a large amount of data is to be transferred at a time, the data can be transferred at a high speed by improving the data transfer rate. However, when repeated transfer of short data is required, the performance is not improved even if the data transfer rate is high if the transfer latency is not reduced.

While the data transfer rate is decided by physical factors such as data transfer bandwidth, the transfer latency mainly depends on the transfer method for transfer of short data. So, the transfer method becomes important.

The prior art parallel computer system generally adopts the data transfer system which is called the SEND/RECEIVE type. In the SEND/RECEIVE type data transfer, when a data send processor executes a data send request instruction (SEND), send data is transferred to a destination node. A processor of the destination node accepts the send data by executing a data receive request instruction (RECEIVE). The SEND instruction designates an area (send area) from which the send data is read, and the RECEIVE instruction designates an area (receive area) into which the send data is stored. Generally, the starting logical address and the send data size are used for designating each of the areas. In the SEND/RECEIVE type transfer, there are the following two meritous features. The method is widely used from the workstation cluster to the massively parallel computer system. (1) It is easy to describe the program (asynchronous transfer) because the send node can execute the SEND instruction without depending on the timing of execution of the RECEIVE instruction at the destination node. (2) Until the receive node designates the receive area by a receive instruction, data is not stored into the receive area of the send node. So, the possibility is low that the data at the destination node is destroyed by a bug in a program at the send node.

However, there is a problem in the SEND/RECEIVE type transfer in that data sent from the send node cannot be stored into the receive area, until the destination node executes a RECEIVE instruction. Therefore, the SEND/RECEIVE type transfer generally requires buffering the send data in the destination node once.

A simple control method of this buffering buffers the send data by the destination processor once without fail and copies data for which a RECEIVE instruction has been executed among buffered data from the buffer onto the receive area. However, the performance is not so high according to this method, because the memory copy is generated for each data transfer.

Japanese Laid Open Patent Application No. HEI 6-324998 intends to cope with this problem by buffering only the data which arrives at the destination node before the RECEIVE instruction is executed, and storing in the receive area the data which arrives at the destination node after the RECEIVE instruction is executed. As a result, the memory copy is reduced and a higher performance is expected. In the parallel computer system of Japanese Laid Open Patent Application No. HEI 6-324998, the destination node should check when it receives the send data whether the RECEIVE instruction corresponding to the send data has already been issued and should search for information designated by the RECEIVE instruction when the instruction has already been issued, and should store the send data in the receive area designated by the information. Thus, in the SEND/RECEIVE type transfer, hardware/software processing needed in achieving the asynchronous transfer is abundant and the transfer latency does not become small.

There is PUT type data transfer provides as a solution to this problem. In PUT type data transfer, the data send request instruction (PUT) executed by the destination processor designates not only the send area but also the receive area. It generally uses the starting logical address and the send data size to designate the area. After the transfer starts, the send data is stored into the receive area unconditionally. So, there is no need for the destination node to issue the data receive request instruction, and no buffer for holding the send data is necessary either. In PUT type data transfer, there are problems in that (1) it must be assured by the user that the send node should execute the PUT instruction after the destination node has entered into a state ready to accept the send data (synchronous transfer), and that (2) the data of the destination node is easily destroyed when there is a bug in the program of the send node. However, it is possible to reduce the transfer latency because the processing required of the destination node only stores the data in the receive area according to the header information of the send data. Therefore, higher performance is expected than from the SEND/RECEIVE type for transfer of short data.

"Architectural support in the PUT/GET Interface for Parallelizing Compiler and Parallel Programs," Proceedings of Parallel processing symposium JSPP'94, pp.233–240, May, 1994 discloses a method of executing PUT type data transfer. In this PUT instruction, both the send area and the receive area are designated by virtual addresses. Here, we consider a case where the computers using the virtual address spaces execute the interprocessor data transfer. It is likely to occur that either the send area or the receive area does not exist on the main storage but on the external storage device such as hard disks, when virtual address spaces which exceed the real size of the main storage are employed or when the memory capacity required by plural processes which concurrently run on the send node or the receive node exceeds the size of the main memory. It is easy to realize with software/hardware that the send node does not start a transfer operation when the send area exists on the external storage device even partially, and starts the transfer after all the data in the send area has been loaded into the main storage. As a result, it is possible to send out all the send data without interrupting the sending operation.

However, the destination node cannot execute the receive operation when the data arrives at the destination node, if all of or parts of the receive area exist in the external storage device. As a result, the send data is reserved in the interprocessor network, which results in congestion in the network and becomes a problem with the system performance. Japanese Laid Open Patent Application No. HEI 6-110845 discloses means (real address fixation) which guarantees by an operating system (OS) that the receive area is sure to exist on the main storage. As a result, it is possible for the receive node to receive the send data without interrupting the transfer, which can prevent the congestion in the network.

However, in PUT type data transfer, the destination node cannot judge where the receive area is, until the send data arrives at the node. Therefore, it is necessary to keep the whole of the data area in the real address fixation state, if the area can possibly receive large data. For instance, it is necessary to keep all of the data receive area in the real address fixation state, if the area can possibly receive the matrix data and it is difficult to judge beforehand to which row the send data to be received belongs, even if the send data includes only one row of the matrix. This remarkably decreases the degree of freedom of virtual memory management.

The technology which does not keep the data area in the real address fixation state, even if the area has the possibility to receive the data is disclosed in United Kingdom Patent no. 2,271,006 which corresponds to Japanese Laid Open Patent Application No. HEI 4-291660 which corresponds to U.S. Ser. No. 08/126,088 or Hamanaka et al, U.S. Ser. No. 07/853,427, now U.S. Pat. No. 5,386,566 corresponding thereto. According to this prior art, the send data is buffered in the receive buffer controlled by an OS when the data receive area which should store the send data is swapped out and does not exist on the main storage, and hardware generates the interruption after the buffering ends. OS interrupts execution of the program being executed in response to the interruption, and executes the interruption processing prepared in OS. The receive area for this data is paged in during this processing and the send data held in the above-mentioned receive buffer is transferred to the data receive area as soon as the paging is over.

Besides the technology including swapping of the above-mentioned receive area, basic programming which uses the PUT type transfer is described next. In the system which executes PUT type data transfer, in order to allow the processor of the destination node to read data from the area into which the data will be stored from the send processor, it is necessary to realize synchronization between the program of the send node and the program of the destination node and to guarantee the end of the storing of the data. Otherwise, a mismatch will occur such as storing data in the receive area by the send node processor while the receive node processor is reading the receive area.

For instance, when the content of data M in node A and the content of data N in node B are to be exchanged, the processors of the node A and B execute the programs shown in FIG. 21. Each node A or B executes the instruction 3000A or 3000B to copy data M or N, respectively. The reason for this is that the PUT instructions 3020A and 3020B stores data directly in the data M and N for the swapping operation. It is necessary to first secure the area into which data is to be stored and thereafter to execute instructions 3010A and 3010B which realize the barrier synchronization between nodes A and B. Otherwise, there is a possibility that another node executes the PUT instruction 3020B (or 3020A) and stores the data, before the area which should be stored by the PUT instruction 3020A (or 3020B) is secured. Often it is impossible to secure beforehand an area into which data is to be stored, especially when a large amount of data is to be transferred, and that it is necessary to secure the area every time when PUT transfer is executed and immediately before that transfer and to realize synchronization. Next, each node executes the PUT instruction 3020A or 3020B. It is necessary for each node to execute the instruction 3030A or 3030B to realize the barrier synchronization again, before each node reads the data stored from another node. The reason for this is that there is no means for each node to know whether storing of data by the PUT instruction issued by the opponent node has ended. Both nodes can read the stored data (exchanged data), after realization of synchronization, because the completion of the PUT instructions by both nodes is guaranteed.

In the method disclosed by the above-mentioned Japanese Laid Open Patent Application No. HEI 4-291660 and U.S. Ser. No. 07/853,427 corresponding thereto, CPU is interrupted every time it receives data which should be stored in the swapped out data area and should execute the interruption processing. There is a problem that execution of the programs being executed at that time is interrupted. In particular, it is necessary to access the external storage device to swap in the swapped out pages. The interruption of the programs under execution increases due to the swapping in. It can occur at the time of the interruption that the programs being executed are not in the state to use the received data.

Therefore, the interruption of the programs under execution which are in such a state is not preferable, with regards to execution efficiency of the programs.

Furthermore, it can happen that the page which holds the receive data will be swapped out again, if the program being executed does not access the page for a while after the page has been swapped in. When the swapping out occurs again, the swapping-in immediately after the receipt of the data becomes useless.

Moreover, in the prior art PUT type data transfer, it is necessary to frequently execute the interprocessor synchronization which has large overhead like the barrier synchronization. When the interprocessor synchronization is executed frequently for the PUT type data transfer, it is difficult to make the best use of the merit of low overhead of the PUT type data transfer.

SUMMARY OF THE INVENTION

Therefore, it is the object of the present invention to provide the data transfer method of the PUT type which enables transfer of data to the data receive area not fixed in the main storage and which does not significantly influence the programs being executed during receipt of the data and to provide a computer system suitable therefor.

Furthermore, it is another object of the present invention to provide a data transfer method with smaller overhead of the interprocessor synchronization and is suitable for the data transfer of the PUT type and to provide a computer system suitable therefor.

In order to achieve the above-mentioned object, the data transfer method according to a mode of operation of the present invention executes the following steps:

sending, from a send node to a destination node, data and a virtual address of a receive area which stores the data in the destination node:

the destination node storing the data in the receive area with the virtual address allocated, when the receive area exists in a main storage of the destination node, at receipt of the data;

the destination node storing the data into a receive buffer area provided in the destination node for temporary storage, when the receive area does not exist in the main storage at receipt of the data: and the destination node transferring the data stored in the receive buffer area to the receive area at subsequent execution of a memory access instruction which requests access to the receive area and issued by a program being executed by the destination node when the receive area is not present in the main storage of the destination node, said transferring being executed after allocating the receive area to the main storage.

The data transfer method according to another mode of operation of the present invention executes the following steps:

transferring, from a send node to a destination node, data, a virtual address of a receive area which stores the data in the destination node, and a comparison value;

the destination node storing a semaphore value designated by a program being executed by the destination node;

the destination node detecting whether the comparison value sent from said send node and the stored semaphore value satisfies a predetermined condition to allow said data to be written in a receive area with said virtual address allocated;

the destination node storing the data in the receive area with said virtual address allocated, when it is determined that the predetermine condition has been satisfied:

the destination node storing the data in a receive buffer area provided in the destination node for temporary storage, when it is determined that the predetermined condition has not been satisfied; and the destination node transferring the data from the receive buffer to the receive area in response to a transfer request subsequently issued by the program.

BRIEF DESCRIPTION OF THE DRAWINGS

FIG. 8 shows information in the reply packet for the interprocessor network (1000).

FIG. 9 shows information in the receive control flag (330) installed in the main storage (50).

FIG. 10 explains the value and the meaning of the comparison method (1090) in the send control register (70).

FIG. 11 explains the value and the meaning of the packet type (1700).

FIG. 12 explains the value and the meaning of the send flag (110) installed in the main storage (50).

FIG. 13 explains the value and the meaning of the receive flag (320) installed in the main storage (50).

FIG. 18 shows information prepared in the address translation table (140).

FIG. 19 explains the meaning of information shown in FIG. 18.

FIG. 23 is a flow chart of the page fault processing executed in the apparatus of FIG. 1.

DESCRIPTION OF THE EMBODIMENTS

Figure 1:
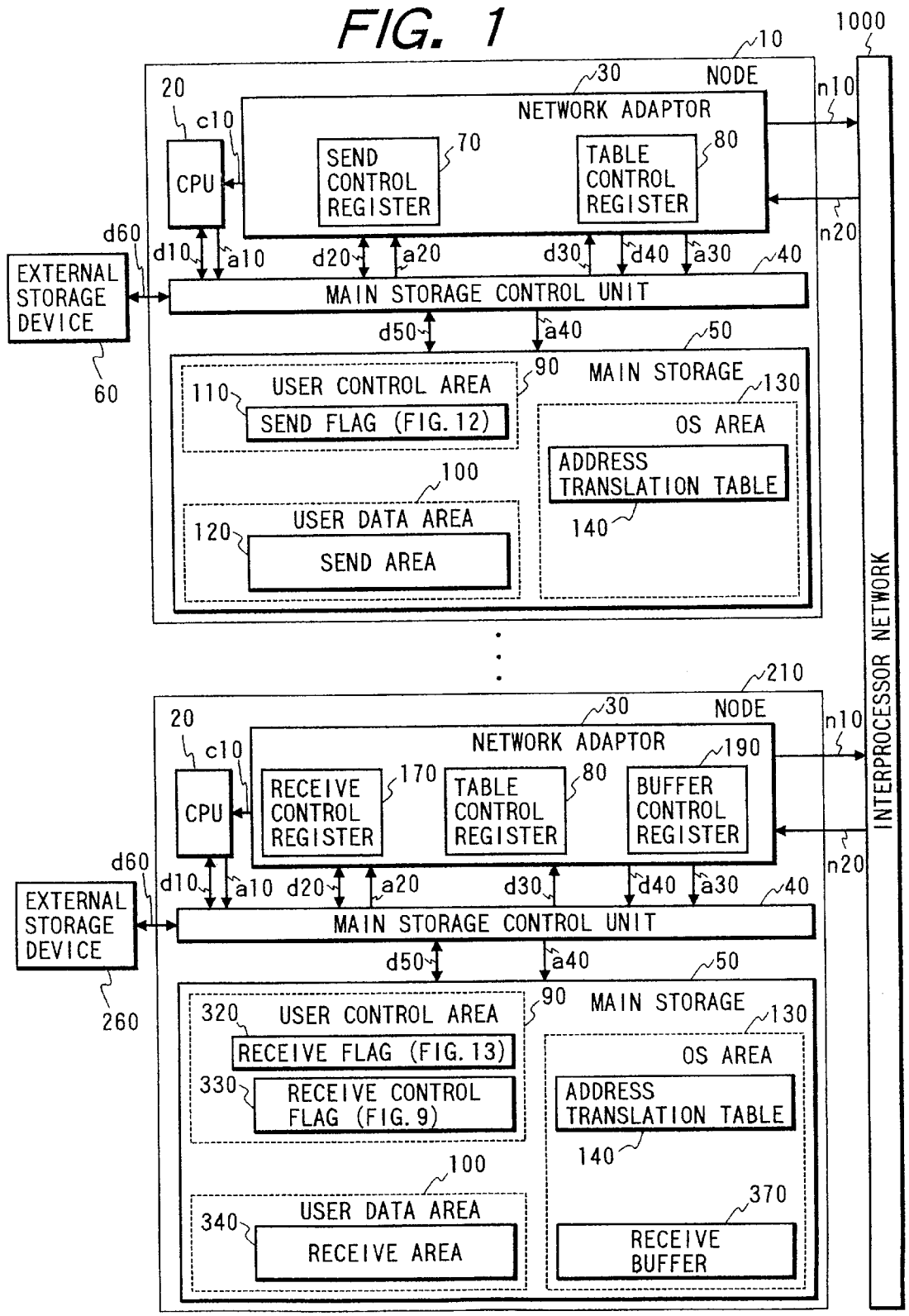
FIG. 1 is a block diagram of the parallel computer system according to the present invention.

The data transfer method and the computer system according to the present invention will be explained hereafter in more detail by referring to the embodiments of the present invention shown in the drawings.

<1> Outline of the Apparatus and Operation

<1.1> Outline of the Apparatus

FIG. 1 shows the schematic diagram of the structure of an embodiment of the parallel computer system according to the present invention. This system unites nodes 10 by the interprocessor network 1000, and each node has CPU 20, the main storage 50, and the network adaptor 30. Each CPU has its own OS.

Network adaptor 30 is a unit which takes charge of the data transfer between nodes, and transfers data to another node, for instance, node 210, when started by CPU 20. Moreover, it has the function of storing data which has been sent from other nodes, for instance, node 210 into the main storage 50. Nodes 10, 210 may have the same or different hardware structure, but it is assumed that the nodes are of the same structure in the present embodiment. FIG. 1, however, shows only the elements which are needed for explaining the operation of the send node when it transfers data stored in the send area 120 of the node 10 to the receive area 340 of node 210, among elements of the network adaptor 30 and the main storage 50 of node 10. Similarly, in FIG. 1, only the elements needed for explaining the operations of the destination node are shown in the network adaptor 230 and the main storage 50 of the node 210 which becomes the destination node.

Each node, for example 10, has CPU 20, the network adaptor 30, the main storage control unit 40, and the main storage 50. In addition, the external storage device 60 is provided for each node. There are a user control area 90 (real address fixation) and a user data area 100 (virtual storage control) in the main storage 50. The data which exists in the user data area 100 does not exist fixedly but can be swapped out, if necessary, to the external storage device 60. Therefore, the send area 120 and the receive area 340 may exist in the main storage 50 or in the external storage device 60. The OS area 130 is provided separately from the user area 90, 100 in each node and is controlled to become in the real address fixation state <1.2> Details of Nodes The elements prepared on the main storage 50 include the following seven elements.

(1) Send Area 120

It is an area to store the send data of the send node 10. This area is prepared in the user data area 100 and controlled as a virtual storage.

(2) Receive Area 340

This is an area into which the send data is to be stored in the destination node 210. This area is prepared in the user data area 100 and controlled as a virtual storage.

(3) Receive Buffer 370

This is an area to temporarily hold the send data in the destination node 210. This area is prepared in the OS area 130 and is fixed in the main memory.

(4) Address Translation Table 140

This is an area to hold address translation information in both the send node and the destination node. This area is prepared in the OS area 130 and is fixed in the main memory.

(5) Send Flag 110

This is a flag which holds the data transfer operation status (transferring, end, etc.) of the send node 10. FIG. 12 indicates the recorded values. Details of the values will be explained later in section <2.2>. This area is prepared in the user control area 90 and is fixed in the main memory. The user program of the send node 10 can find the current state of the transfer operation by reading this flag.

(6) Receive Flag 320

This is a flag which records the data transfer operation status (receiving, buffered, etc.) of the destination node 210. FIG. 13 indicates the recorded values. Details of the values will be explained later in section <2.2>. This area is prepared in the user control area 90 and is fixed in the main memory. The user program of the destination 210 can find the current state of the transfer operation by reading this flag.

(7) Receive Control Flag 330

This is a flag which contains the semaphore and the number of buffered data, and so on. This flag is used to synchronize receipt of data and a progress of a program in the destination node. FIG. 9 shows the composition of this flag. Details of the values will be explained later in section <2.2>. The flag area is prepared in the user control area 90 and is fixed in the main storage. To be more specific, the semaphore 2010 is used to judge whether the destination node 210 is in the state in which it cannot transfer the send data to the receive area 340, because the destination node 210 has not ceased to use the receive area 340 at receipt of the send data. The present embodiment adopts the method of forcing the send data to be stored in the receive buffer 370 temporarily, when the receive area 340 is in the state in which the receive area 340 cannot accept the data transfer, because the destination node 210 has not ceased use of the receive area 340 or because of other reasons.

Figure 2:
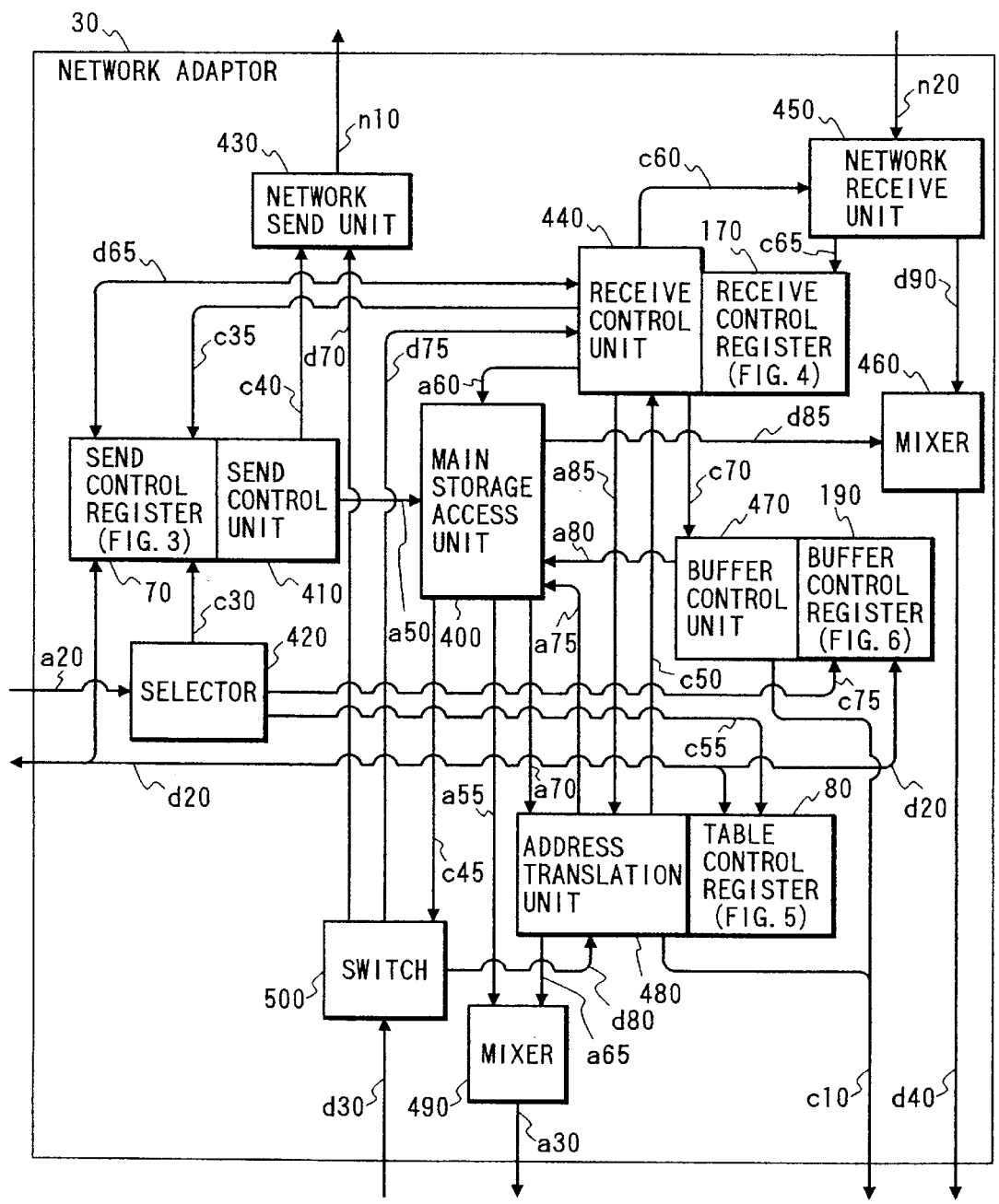
FIG. 2 is a block diagram of the network adaptor (30) used for the apparatus of FIG. 1.

FIG. 2 shows the composition of the network adaptor 30. The following are main elements.

(1) Send Control Register 70

Figure 3:
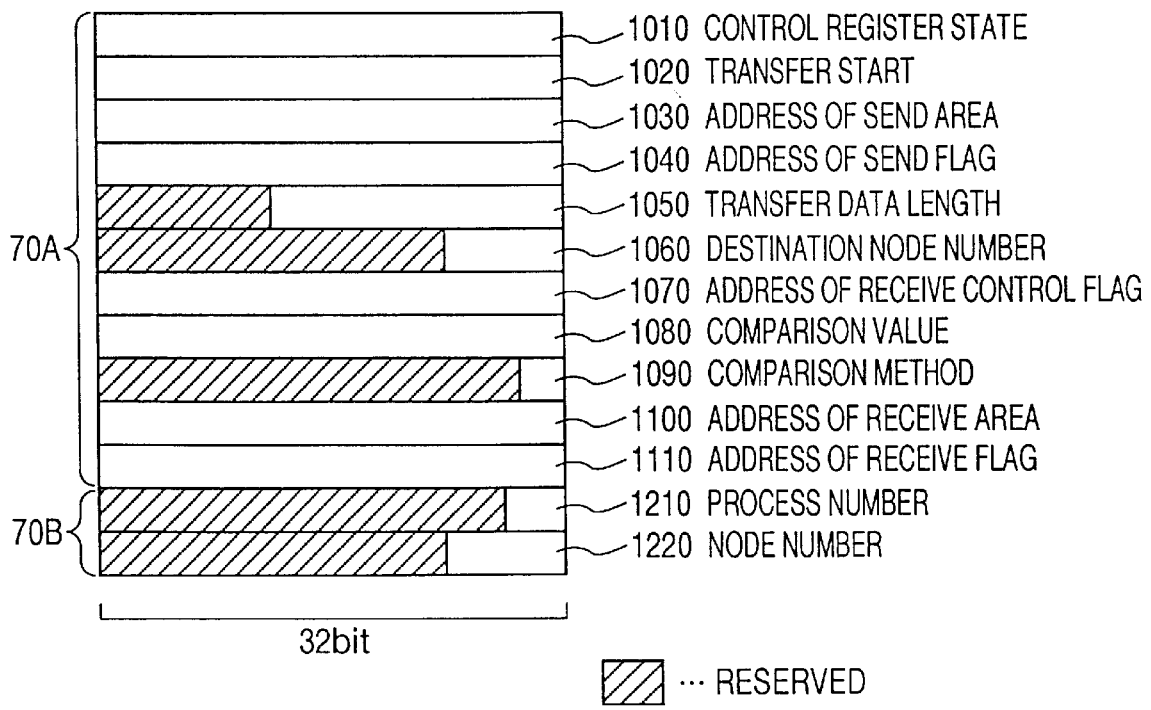
FIG. 3 shows information in the send control register (70) used in the network adaptor (30) of FIG. 2.

This register records the transfer requests from CPU 20. FIG. 3 shows the internal composition of this register.

(2) Send Control Unit 410

This unit executes the transfer operation based on information in the send control register 70.

(3) Network Send Unit 430 and Network Receive Unit 450.

These units handle connection with the network 1000.

(4) Receive Control Register 170

Figure 4:
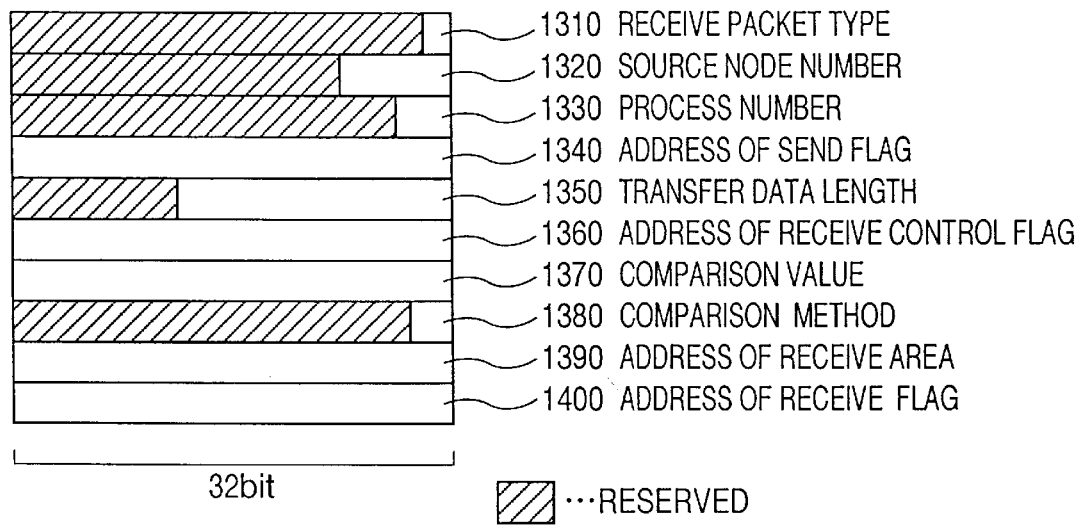
FIG. 4 shows information in the receive control register (170) used in the network adaptor (30).

This register records the transfer control information when the send data from another node arrives. FIG. 4 shows the internal composition.

(5) Receive Control Unit 440

This unit executes a receive operation based on information in the receive control register 170.

(6) Main Storage Access Unit 400

This unit responds to main storage 50 access requests, such as those from the send control unit 410 and the receive control unit 440, and accesses the main storage.

(7) Table Control Register 80

Figure 5:
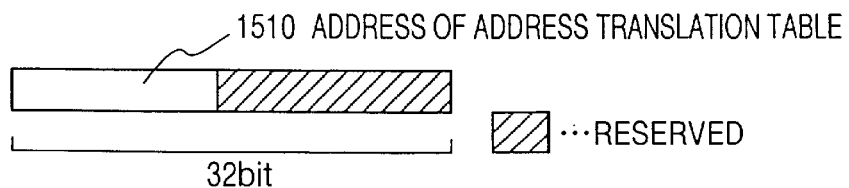
FIG. 5 shows information in the table control register (80) in the network adaptor (30).

This register holds the real address information on the address translation table 140. To be more specific, it holds the starting address 1510 of the table 140. FIG. 5 shows the internal composition.

(8) Address Translation Unit 480

This unit executes virtual-to-real address translation, based on information of the address translation table 140, in response to the access request from the main storage access unit 400.

(9) Buffer Control Register 190

Figure 6:
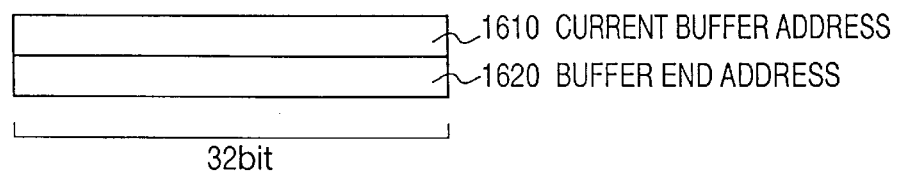
FIG. 6 shows information in the buffer control register in the network adaptor 30.

This register holds address information on the receive buffer 370. FIG. 6 shows the internal composition.

(10) Buffer Control Unit 470

This unit executes the store operation of the send data in the receive buffer 370, based on information of the buffer control register 190. The operations of the above-mentioned composition elements will be explained later in section <2.2>.

<1.3> Data Transfer Instruction

Figures 20, 21:
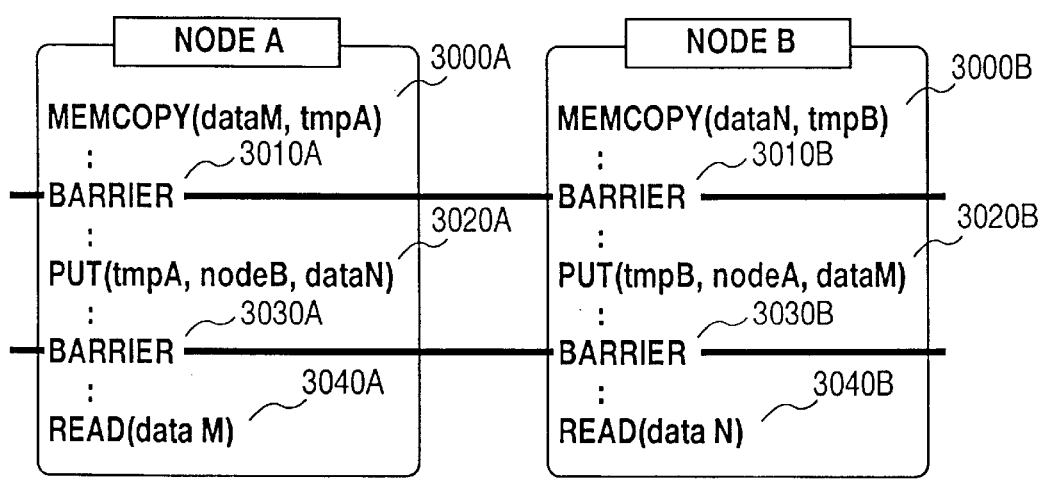
FIG. 20 shows the format of the data transfer instruction PUT used in the apparatus of FIG. 1.
FIG. 21 shows an example of a program which uses the prior art PUT instructions.

FIG. 20 shows the format of the data transfer instruction (PUT instruction) used in the present embodiment. The following nine parameters are designated by this instruction.

(1) Transfer Data Length 2710

This parameter designates the number of bytes of transferred data. The maximum length of the transfer data restricted by hardware is presumed to be 1 MB (megabytes) in the present embodiments. Details of the parameters will be explained later.

(2) Send Area Starting Address 2720

This address designates the virtual address of the send area 120 in the send node 10.

(3) Send Flag Address 2730

This address designates the virtual address of the send flag 110 in the send node 10.

(4) Destination Processor Number

This number designates the number of the destination node (number of node 210).

(5) Receive Control Flag Address 2750

This address designates the virtual address of the receive control flag 330 in the destination node 210.

(6) Comparison Value 2760

This is the information newly used in the present embodiment, and designates the value to be compared with the semaphore value (2010 of FIG. 9) in the receive control flag 330. This is the unsigned 32 bit data.

(7) Comparison Method 2770

This is also the information newly used in the present embodiment. This designates the method of comparison of the semaphore 2010 and the comparison value 2770. FIG. 10 shows the relation between the value of this comparison method 2770 and the executed comparison method. By designating various conditions by using the value of this comparison method 2770 and the comparison value 2760, the synchronization between the receipt of the data and the progress of the destination node program can be easily attained. Specifically, these pieces of information are used to judge whether the destination node 210 is in such a state that it cannot transfer the data to the receive area 340, because the destination node 210 has not ceased using the receive area 340 at receipt of the data.

For this usage, the processes of the destination node are constructed in the present embodiment so as to rewrite the semaphore 2010 according to the progress of the program, as will be explained later. If the condition designated by this the comparison method 2770 is not satisfied at receipt of the data, the send data is forced to be stored in the receive buffer 370, without depending on the value of the comparison method 2770. As a result, the send data is transferred to the receive buffer 370 without being transferred to the receive area 340. The send data will be transferred later from the receive buffer 370 to the receive area 340, thereby reducing the overhead of the synchronous processing between processes necessary for transfer of the data.

(8) Receive Area Starting Address 2780

This address designates the virtual address of the receive area 340 in the destination node 210.

(9) Receive Flag Address 2790

This address designates the virtual address in the receive flag 320 in the destination node 210.

In the present embodiment, the data transfer which extends a page boundary (1 MB boundary) is not allowed. Therefore, if either one of the send area and the receive area extends over a page boundary, transfer of the data between them should be transferred for different portions of the data which are determined so that each data portion does not extend over the page boundary. Similarly, large data which exceeds 1 MB should be dealt by conducting the data transfer two or more times.

<1.4> An Example of Use of Receive Control Flag

Next, the interprocessor data transfer which uses the receive control flag 330, the comparison value 2760, and the comparison method 2770 will be explained by referring to a specific program example shown in FIG. 22. The program shown is similar to the prior art program shown in FIG. 21, in that they are programs for exchanging the content of the data M in node A and the content of the data N in node B, but the program shown in FIG. 22 differs from that shown in FIG. 21 in that the former uses the PUT instruction shown in FIG. 21. Representation of the PUT instruction is simplified in FIG. 22, unlike one shown in FIG. 20. That is, data M, flag (sa), and node B in the PUT instruction 3120A or 3120B show the send area starting address 2720, the send flag address 2730, and the destination processor number 2740 in FIG. 20, respectively. "When flag (b)>0" indicates that receive control flag address 2750 designates the receive control flag "b", the comparison value 2760 designates 0, and the comparison method 2770 designates ">". Moreover, data N and flag (rb) show the receive area starting address 2780 and the receive flag address 2790, respectively. The transfer data length 2710 of FIG. 20 is omitted in FIG. 22. The first instruction series 3100A of the user program of the send node and the instruction series 3100B of the user program of the destination node initializes the receive control flag (a, b), the send flag (se, sb), and the receive flag (ra, rb) which these programs use. The instructions 3110A and 3110B for the interprocessor barrier synchronization are executed to guarantee that both nodes have finished initialization.

The flags are of small sizes and can be easily initialized at the head portion of the programs, and therefore, the barrier synchronization instructions 3110A and 3110B can be included at the head of these programs. Nodes A and B execute the PUT instructions 3102A and 3102B, respectively after they execute various program instructions.

The PUT instruction 3120A executed by node A indicates that the send data of data area M is put to the receive area N of node B by using the flag "sa" as the send flag, with a condition that the send data is stored in the receive buffer, if the semaphore value in the receive control flag "b" in node B is not larger than 0, and that completion of storing of the send data is recorded in the receive flag "rb" in node B.

Similarly, the PUT instruction 3120B executed by node B indicates that the send data of data area N is put to the receive area M of node A by using the flag "sb" as the send flag, with a condition that the send data is stored in the receive buffer, if the semaphore value in the receive control flag in node A is not larger than 0, and that completion of storing of the send data is recorded in the receive flag "ra" in node B. As will be explained in further detail, when the PUT instruction 3120A of node A is executed, the value of the send flag "sa" is updated in the course of execution of the instruction, according to the transfer state of the send data as shown in FIG. 12. In addition, the value of the receive flag "rb" in node B is updated according to the transfer state of this send data, as shown in FIG. 13.

Similarly, when the PUT instruction 3120B of node B is executed, the value of the send flag "sb" is updated in the course of execution of the instruction, according to the transfer state of the send data as shown in FIG. 12. In addition, the value of the receive flag "ra" in node A is updated according to the transfer state of this send data, as shown in FIG. 13.

As will be explained in further detail in the explanation of the operation of the reception node, when the PUT instruction 3120A is executed by node A, and, as a result of the execution, the data in the data area M of node A is transferred to node B, and the semaphore value in the receive control flag "a" is compared with the value 0 designed by this PUT instruction according to the comparison method (>) designed by this instruction.

Either when the value of this semaphore is not larger than 0, or when the value of this semaphore is larger than 0 but data area N which this PUT instruction designates does not exist in the main storage, this send data is stored in the receive buffer of node B. When the value of this semaphore is larger than 0 and at the same time data area N exists in the main storage, this send data is stored in data area N at once. The same occurs when the data of data area N is node B is transferred to node A by execution of the PUT instruction 3120B by node B.

The semaphore in the receive control flag "a" on node A and the semaphore in the receive control flag "b" in node B are renewed by the instructions series 3130A and 3130B, as follows.

In node A, the instruction series 3130A is executed, after suitable instructions are executed after the PUT instruction 3120A. The WAIT instruction in this instruction series 3030A is an instruction which waits for completion of transfer of the send data which the PUT instruction 3120A executed by node A designates. To be more specific, this WAIT instruction waits until the transfer state of this send data becomes the send-completed/store-to-buffer-completed state or the send-completed/store-to-receive-area-completed state, as shown in FIG. 12. That is, the instruction waits until the value of the send flag "sa" becomes equal to or greater than the smaller value 0010 within the flag value 0010 (the binary number) which shows the send-completed/store-to-buffer-completed state, as shown in FIG. 12, and the flag value 1010 which shows the send-completed/store-to-receive-area-completed state. SFIN in the WAIT instruction shows this specific flag value 0010. The SET instruction is an instruction which sets the semaphore value in the receive control flag "a" to "1", when waiting by the WAIT instruction has succeeded.

Similarly, in node B, the instruction series 3130B is executed after suitable instructions are executed after the PUT instruction 3120B. The WAIT instruction in this instruction series 3130B is an instruction which waits for completion of transfer of the send data which the PUT instruction 3120B executed by node B designates. To be more specific, this WAIT instruction waits until the value of the send flag "sb" becomes equal to or greater than the value 0010. The SET instruction is an instruction which sets the semaphore value in the receive control flag "a" to "1" when waiting by the WAIT instruction has succeeded.

Therefore, when the instruction series 3130A has already been executed in node A, until the data of data area N of node B is transferred from node B by PUT instruction 3120B is received by node A, the value of the semaphore in the receive control flag "a" is "1". So, this send data will fulfill the condition which PUT instruction 3120B executed by node B designates. Therefore, this send data will be stored in either of the data area M or the receive buffer 370 of node A, depending upon whether data area M in node A exists in the main storage. Thus, the network adaptor 30 of node A will prevent the data transferred from another node being stored in the data area M before the programs on node A cease using the data area M. This is the same with node B.

In the programs of FIG. 21 for the prior art PUT type data transfer, it was necessary to execute the barrier synchronization instruction 3010, 3030 for the data transfer which exchanges data M in node A and data N in node B. As a result of use of the new PUT instructions in the present embodiment, the programs of FIG. 22 do not need such instructions. Thus, the present embodiment can reduce the instruction required for interprocessor synchronization in the interprocessor data transfer. This is due to the following reasons.

Figure 22:
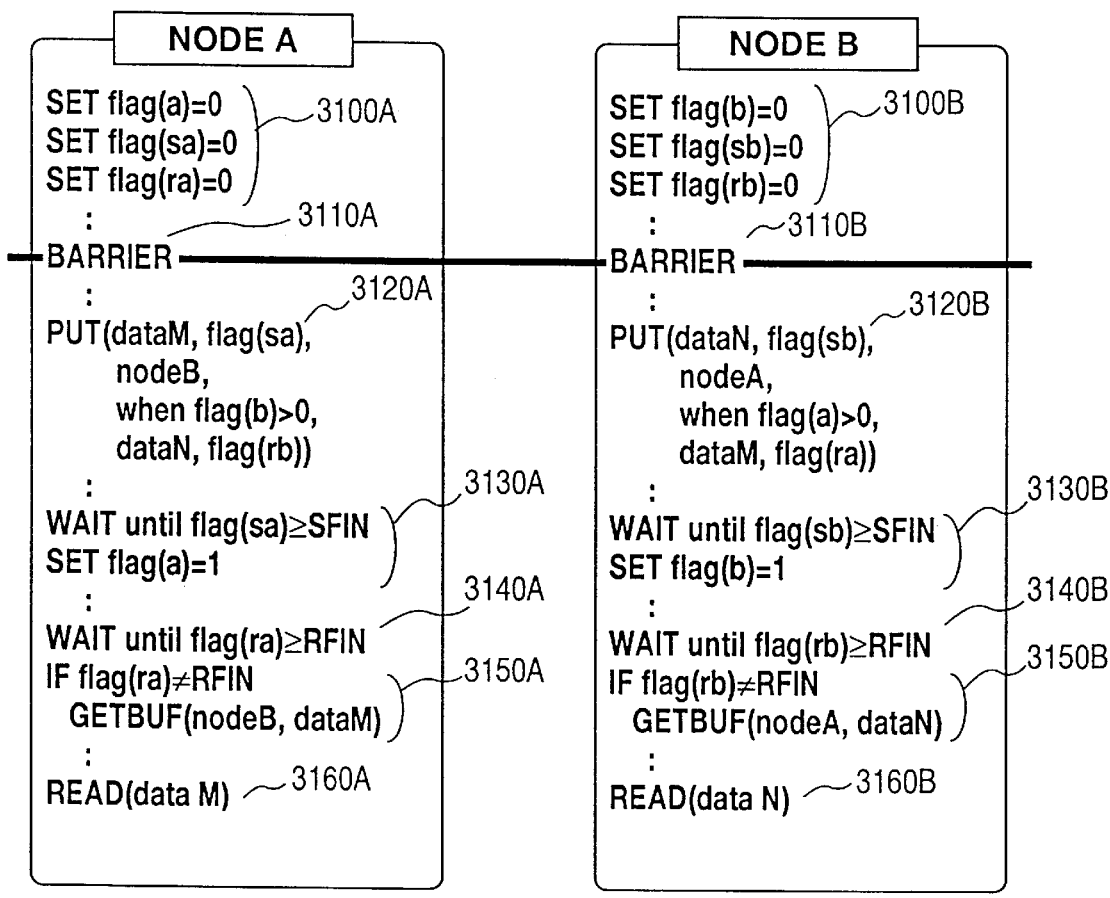
FIG. 22 shows an example of a program used for the apparatus of FIG. 1.

That is, the program of the destination node sets a semaphore which has a value indicative of the end of use of the data area in the receive control flag, when the program of the destination node has ceased to use the data area, as shown in FIG. 22. The network adaptor 30 of the destination node judges, based on the value of the semaphore, whether the program of the destination node has ceased to use a data area in which the send data should be stored. The network adapter 30 prevents the send data from being stored in the data area before the program of the destination node ceases to use the data area in which the send data should be stored. In the present embodiment, the PUT instruction executed by the program of the send node designates the receive control flag used to judge whether the send data is to be stored in the receive area, and further designates the comparison method and the comparison value used in the judgment, thereby achieving the control with more freedom.

In addition, in the programs of FIG. 21, it was necessary to execute the instruction which specifies and copies the send data before execution of the data transfer instruction like the instruction 3000A or 3000B, etc. But, no such instruction is needed in the present embodiment. This advantage results from the fact that the network adaptor 30 of the destination node uses the receive control flag and controls whether the transferred data is to be stored in the data area, as mentioned above.

Node A confirms whether the data has been put in data area M of node A based upon the value of the receive flag of node A. That is, the succeeding WAIT instruction 3140A of node A is an instruction which waits for completion of the data transfer to node A by PUT instruction 3120B of node B. Specifically, this instruction waits for the transfer state of data which this PUT instruction 3120B designates to become the store-to-buffer-completed state or the receive completion state, as shown in FIG. 13. That is, this instruction waits for the value of flag "ra" which PUT instruction of node B designates as the receive flag for the data of data area M to become equal to or greater than a smaller value 0100 among the flag value 0110 which shows the store-to-buffer-completed state and the flag value 0100 which shows the receive-completion/store-completion state, as shown in FIG. 13. RFIN in the instruction WAIT shows the flag value 0100. The succeeding IF instruction 3150A includes a system call which requests the OS to draw out this send data from the receive buffer 370 to data area M, when the value of the receive flag "ra" is not equal to RFIN but equal to 0110, that is, when data to be sent to the data area M from node B was stored in the receive buffer of node A but is not yet stored in data area M. The OS responds to this system call and executes drawing out of this data. If the data area M is already swapped out from the main storage at this time, the main storage is allocated to data area M, before drawing out of the data. When the value of the receive flag "ra" is 0100, the IF instruction is not executed. Node A issues the READ instruction 3160A to request reading of the data in this data area M, after the IF instruction 3150A. When the node A executes the READ instruction 3160A, data area M already exists in the main storage and the send data has already been stored there. So, the READ instruction is executed at once.

Similarly, node B confirms whether the data has been put in data area N based upon the value of the receive flag of node B. That is, the succeeding WAIT instruction 3140B of node B is an instruction which waits for completion of the data transfer to node B by the PUT instruction 3120A of node A. Specifically, this instruction waits for the transfer state of data which this PUT instruction 3120B designates to become the store-to-buffer-completed state or the receive completion state, as shown in FIG. 13. That is, this instruction waits for the value of flag "rb" which PUT instruction node B designates as the receive flag for the data of data area N to become equal to or greater than a smaller value 0100 among the flag value 0110 which shows the store-to-buffer-completed state and the flag value 0100 which shows the store-to-receive-area-completed state, as shown in FIG. 13. The succeeding IF instruction 3150B includes a system call which requests OS to draw out this send data from the receive buffer 370 to data area N, when the value of the receive flag "rb" is not equal to RFIN, that is, when data to be sent to the data area N from node A is stored in the receive buffer of node B but is not stored in data area N yet. Node B also issues the READ instruction 3160B, after the IF instruction 3150B.

As understood from the execution mode of the instructions 3140A, 3150A, 3160A, 3140B, 3150B, and 3160B, when each node reads the send data from another node, each node can confirm the arrival of the data by the receive flag. Therefore, it is not necessary to synchronize between the send node and the receive node.

<2> Details of the Apparatus
<2.1> Memory Management

Figure 14:
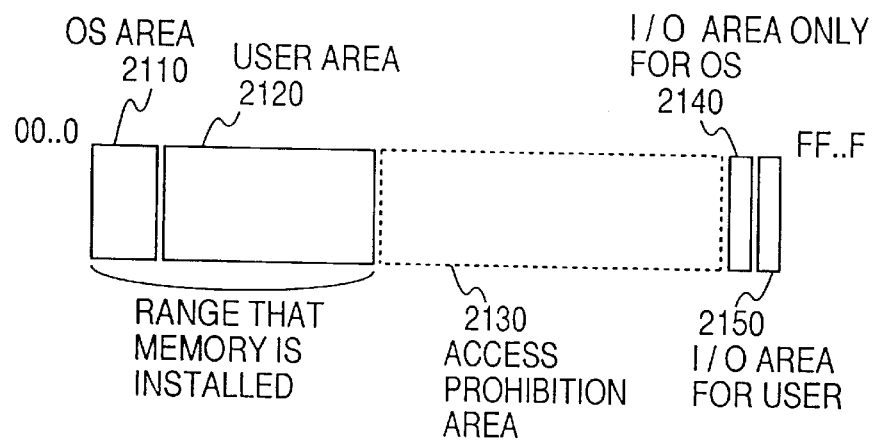
FIG. 14 explains the real address space used for the device of FIG. 1.
Figure 15:
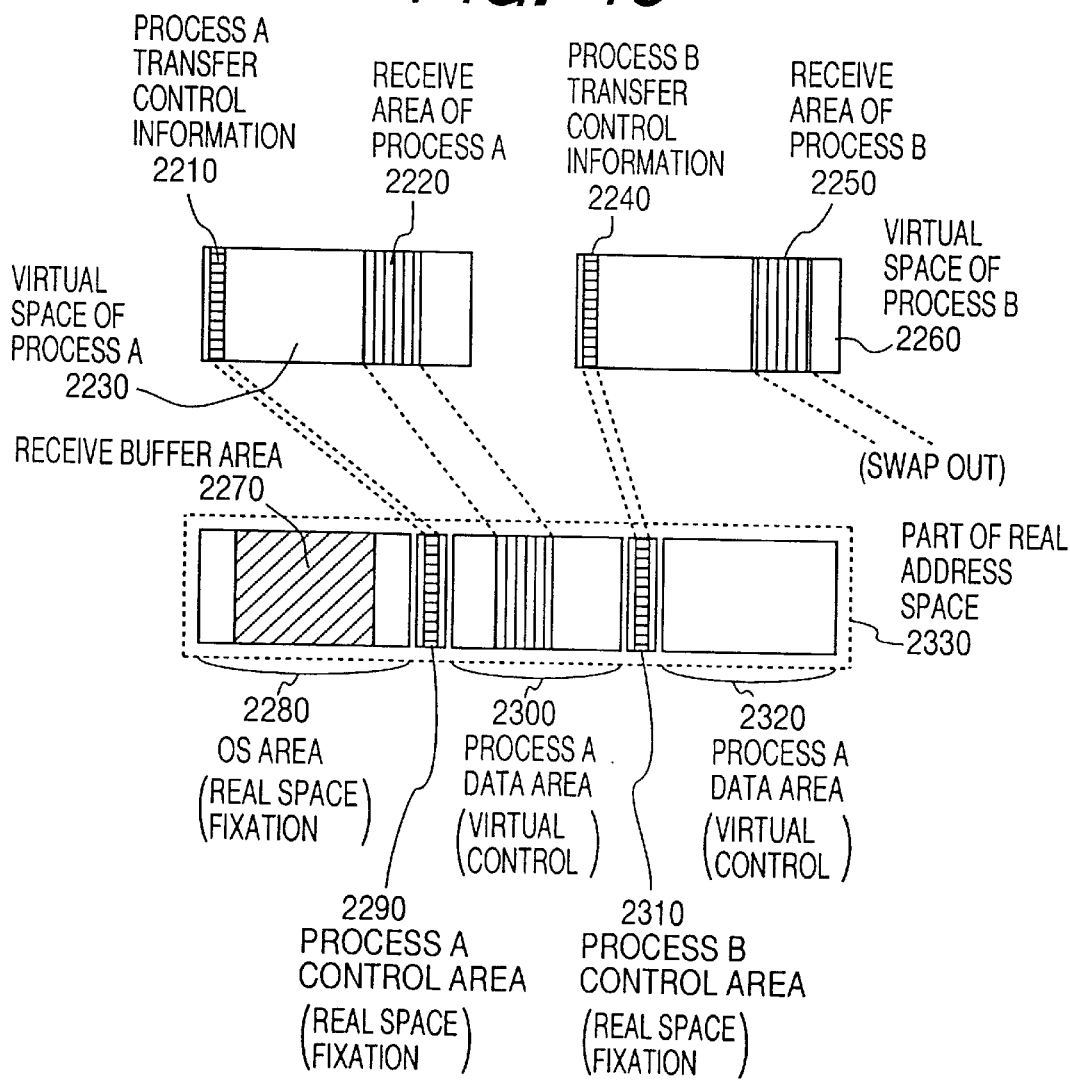
FIG. 15 explains the method of the mapping to the real address space from the virtual address space used in the apparatus of FIG. 1.

In this chapter, the method of controlling the memory space of the present computer system, structure of the apparatus, and the user interface will be briefly explained. FIG. 14 shows the real address space in each node in the present embodiment. There are the OS area 2110 and the user area 2120 within the range where the main storage exists. The I/O area has the I/O area only for OS 2140 which can be accessed only by OS and the I/O area for user 2150 which can be accessed even in the user mode. Protection is executed against the access from the user mode to the I/O area only for OS 2140, by generating the interruption in the address translation. More details will be described later. FIG. 15 shows the method of the mapping of the virtual address space to the real address space in the present embodiment.

The mapping from the virtual address space to the real address space is executed in each node. FIG. 15 shows the method of the mapping when processes A and B run on one node. The control area 2290 (or 2310) and data area 2300 (or 2320) are provided in the real address space 2330 for each process A (or, B). Among these, OS fixes the control area 2290 or 2310 in the real address space. That is, presence of this control area fixedly on the main storage is guaranteed by OS. The transfer control areas 2210, 2240 of process A are allocated to the control area 2290, 2310, respectively. Data areas 2300, 2320 receive the virtual storage control. That is, these areas may not necessarily be present in the real address space and be allowed to be swapped out to the external storage device. Receive area 2220, etc. are allocated to these data areas 2300, 2320. In the present embodiment, the OS area 2280 which OS uses is fixed in the real address space. That is, OS manages the real memory so as to keep this area fixedly in the main storage.

In the present embodiment, it is assumed that the unit size of swapping-in/swapping-out (this is equal to the page size) in the virtual storage control is 1 MB. That is, the data area 2300, 2320 of each process are swapped in or out between the external storage device and the main storage, in units of each page size (1 MB). Moreover, it is assumed that each virtual address space has the address of 32 bits, that is, of the size of 4 GB. That is, each virtual address space is composed of 1 MB×4K pages.

<2.2> Details of the Operation

This section explains the operation of OS, the operation of the send node and the operation of the destination node in this order.

<2.2.1> Operation of OS

One of the important operations of OS is to make the address translation table 140. The process number which OS assigns to each process will be explained before explanation of the address translation. OS prepares 0–15 as the process numbers. OS secures 0 for OS itself, so other processes of the process numbers 1–15 can operate at the same time.

Figure 16:
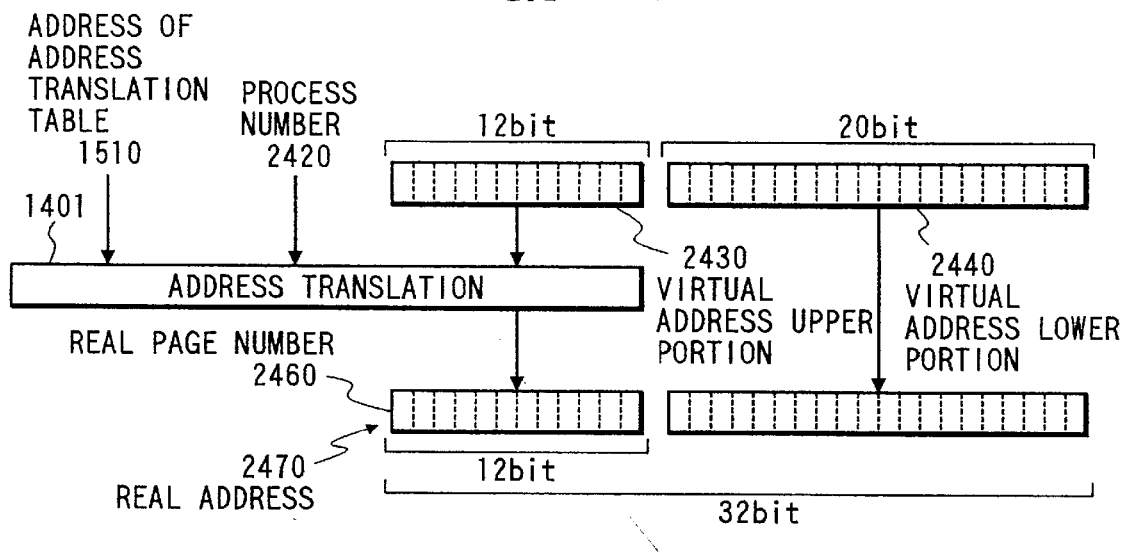
FIG. 16 explains the method of the address translation used in the apparatus of FIG. 1.

First, the method of the address translation in the present embodiment will be explained by using FIG. 16. The address translation is executed by the address translation unit 480 (FIG. 2) of the network adaptor 30. The operation itself of the address translation unit 480 will be explained later at <2.2.2> and <2.2.3>. In the present embodiment, the 32 bit virtual spaces are managed with 1 MB pages. So, the 12 bit upper portion 2430 of the virtual address should be translated of 2430.

Figure 17:
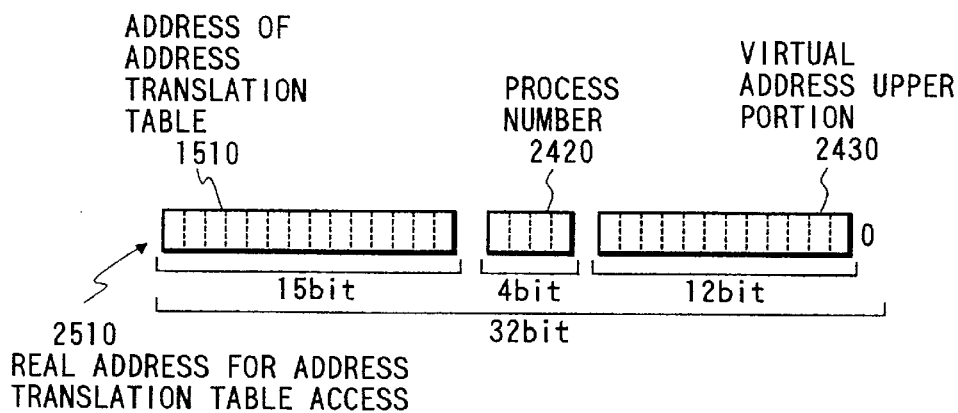
FIG. 17 explains the method of generating the address to access the address translation table (140).

The address translation table 140 (FIG. 1) is referred to by the translation table address 1510 of 12 bits (FIG. 5) maintained in the table control register 80 (FIG. 2), and the process number 2420 of the process which requested the address translation, and the real page number 2460 is obtained. The real address 2470 is then obtained from this real page number. The calculation method for reading an entry in the address translation table 140 by using the upper portion 2430 of the virtual address, the table control register information 2410 and the process number information 2420 will be explained next by referring to FIG. 17. The least significant bit of the real address is set to 0 automatically. The reason is that each entry of the address translation table 140 includes 16 bits. To this bit, the virtual address upper portion 2430, the process number 2420, and the table control register information 2410 are sequentially combined, to get the real address. This address is used to access the address translation table 140. Address translation table 140 comprises, for each process, 16 tables each of 8 KB (16 bits×4K entries). FIG. 18 shows the content of each entry of the address translation table 140. Each entry has V bit 2610, R bit 2620 and M bit 2630 besides the real page number 2460 for the address translation. The meaning of each bit is shown in FIG. 19.

Another important operation in the present embodiment is an operation to set the process number and the node number in the send control register 70 in the network adaptor 30 before the data transfer operation. The composition of the send control register 70 is shown in FIG. 3. The register comprises plural registers. The registers are further divided into two register groups 70A and 70B. The register group 70B can be accessed from the user and the register group 70A can be accessed only from Os. Each register is mapped by a so called method of the I/O mapping into the real address space. Accessibility from the user process to an address is dependent upon whether the address is mapped into the I/O area for user 2150 or into the I/O area only for OS 2140. In other words, when seen from the user process, the access will be refused at the time of the address translation, when the user process requests access to a register with an address belonging to the I/O area only for OS, because the entry to access the register does not exist in the address translation table 140 or V bit of the entry is 0 even if the entry exists.

The register group 70B has a field 1210 which holds the process number of a process currently being executed and a field 1220 which holds the number of the node where the network adaptor 30 exists. In the example of FIG. 1, the node number given to node 10 is maintained in field 1220 of the send control register 70. The node number is set when the system is started up, and OS sets the process number at switch of processes.

Moreover, OS sets values in the table control register 80 and the buffer control register 190 of FIG. 2. The start real address of the address translation table 140 is stored in the table control register 80 as shown in FIG. 5. OS secures the area for the receive buffer 370 in the OS area 130 of a multiple of 1 MB matched with the page boundary. When OS secures this area, it sets the starting address of the area in the current buffer address 1610 (FIG. 6) in the buffer control register 190, and sets the end address of the area into the buffer end address 1620 (FIG. 6), after subtracting 1 MB+28 B (bytes) from the end address. OS increases the current buffer address 1610 every time when the send data is stored in the receive buffer 370 by an amount equal to the data length of the stored data. The details of the operation will be explained later at <2.2.3>.

When the value of the current buffer address 1610 exceeds the buffer end address 1620, an interruption request is issued to CPU 20. As mentioned above, the maximum transfer data length is 1 MB, and the maximum length stored in the buffer at a time together with the packet header described later is 1 MB+28 B. Therefore, it is guaranteed that data transferred by the last one transfer can be stored in the receive buffer 370 completely. When OS receives the above-mentioned interruption generated during the receive buffer control, OS newly prepares the buffer area on the main storage, sets the address translation table 140 so that the newly prepared buffer area becomes an area connected to the end address of the receive buffer 370 already present, and renews the buffer end address 1620 according to the newly prepared buffer area. The operation at this time will also be explained at <2.2.3>. The table control register 80 and the buffer control register 190 are mapped in the I/O area only for OS 2140 explained with FIG. 14 and <2.1>, and only OS can access them.

Next FIGS. 1 and 2 are used to explain a flow of the signals generated when CPU 20 accesses the send control register 70, the table control register 80, and the buffer control register 190 as well as the procedure by which CPU 20 accesses the above-mentioned register group within the network adaptor 30.

CPU 20 issues a request to line a10, with the address to a register within the register group which exist in the I/O area only for OS. This address is the send control register 70, the table control register 80, and the buffer control register 190, prepared in the I/O area only for OS 2140 shown in FIG. 14. The main storage control unit 40 issues the received request to the network adaptor 30 through line a20. The request is transmitted to the selector 420 in the network adaptor 30. Selector 420 judges from the address value to which one of the send control register 70, the table control register 80, and the buffer control register 190 the request is directed, and starts a corresponding one of lines c30, c55 and c75.

Thus, it comes to that CPU 20 can exchange data with either one of the send control register 70, the table control register 80, and the buffer control register 190, through line d10, the main storage control unit 40, and line d20.

<2.2.2> Operation of Send Node

Next will be explained sequential operations of the send node with reference to the node 10 of FIG. 1 and FIG. 2. In the following explanations, the figure enclosed with a pair of quotation marks " " is a value of the binary number representation.

[1] Start of Transfer

CPU 20 starts the transfer start processing in response to issuing of the data transfer instruction PUT (FIG. 20) by a user program. CPU 20 issues a request to line a10, with an address corresponding to the register group 70A which exists in the I/O area for user of the send control register 70. Main storage control unit 40 issues the received request to the network adaptor 30 through line a20, as the address is for information to be stored in the send control register 70 prepared in the I/O area for user 2150 shown in FIG. 14. The request is transmitted to the selector 420 in the network adaptor 30. The selector 420 judges from the value of the address that the request is an access request to the send control register 70 by CPU 20, and starts line c30. A series of operation above enables CPU 20 to exchange data with the send control register 70 through line d10, the main storage control unit 40, and line d20.

CPU 20 accesses the send control register 70 as follows. First, CPU 20 reads the control register state 1010. In the control register state field 1010, "1" has already been set, when the send control register 70 keeps being used for the data transfer started before and "0" is set therein, when the send control register 70 is not in use for the data transfer started before. When the control register state 1010 as read shows that this register is still in use, CPU 20 repeatedly executes polling to the control register state 1010 until the send control register 70 is no longer in use. When this register becomes ready to use, CPU 20 sets nine parameters designated by the data transfer instruction PUT (FIG. 20) in the user program, in the send control register 70. CPU 20 finally stores in the transfer start field 1020 in the send control register 70, 110011 which shows that the send control register is in the transfer start state. As a result, the send control unit 410 is started, and Network adaptor 30 starts the data transfer operating as follows.

[2] Update of the Send Flag (1)

When started, the send control unit 410 responds to the transfer start processing, and issues to the main storage access unit 400 through line a50, a store request which requests a value 0001 (Refer to FIG. 12) indicative of the transfer operation start state to be stored in the send flag 110 in the main storage 50, as designated by the send flag address 1040 (FIG. 3) of send control register 70. This store request designates, as the main storage address, a combination of the receive flag address in above-mentioned field 1040 and the process number 1210 already set in the send control register 70. Main storage access unit 400 issues the virtual address and the process number of the send flag 110 to the address translation unit 480 through line a70.

Address translation unit 480 calculates the address of the entry in the address translation table 140 by the method explained before, and issues the real address obtained as a result of address translation. to the main storage access unit 400 through line a75.

Main storage access unit 400 issues a read request for data with the real address to the address translation table 140 through line a55, the mixer 490, line a30, the main storage control unit 40 and line a40. At the same time, main storage access unit 400 switches switch 500 to the address translation unit 480 side through line c45.

The address translation information (Refer to FIG. 18) read from the address translation table 140 enters the address translation unit 480 through line d50, the main storage control unit 40, line d30, switch 500, and line d80. If V bit 2610 is 0 among the address translation information, the address translation unit 480 interrupts CPU 20 through line c10. The reason is because V bit 2610 of 0 shows that the transfer request designated by the user was improper. Therefore, it is necessary to switch to OS and to request OS to terminate the process adequately. Moreover, when R bit 2620 and M bit 2630 are both 0, the address translation unit interrupts CPU 20 through line c10. When OS receives this interruption, OS considers that the transfer request designated by a user program is improper, because the send flag 110 should exist in the control area 90, that is, in the area of real address fixation, and takes an appropriate processing such as termination of the program.

When the address translation unit 480 can duly access the information of the address translation table, it calculates the real address of the send flag 110 based on the real page number 2460 (FIG. 18), and requests the main storage access unit 400 through line a75, to store the value "0001" indicative of the transfer start state (Refer to FIG. 12) at a location of the calculated real address.

Main storage access unit 400 issues a store request to the send flag 110 on the main storage, through line a55, the mixer 490, line a30, the main storage control unit 40, and line a40, and sends the value "0001" indicative of the transfer start to the send flag 110, through line d85, the mixer 460, line d40, the main storage control unit 40, and line d50.

[3] Start of Data Transfer

Next, the send control unit 410 sends the network send unit 430 information stored in the send control register 70 and needed in making a data transfer packet through line c40. This needed information includes plural pieces of information other than the control register state 1010 and the transfer start bit 1020 among plural pieces of information shown in FIG. 3. At the same time, send control unit 410 issues a read request requesting readout of the send area 120 to the main storage access unit 400 simultaneously with this.

Main storage access unit 400 and the address translation unit 480 read address translation information from the address translation table 140 according to the same procedure same as mentioned above. Here, if V bit 2610 or M bit 2630 is 0, the address translation unit 480 interrupts CPU 20 through line c10. When V bit 2610 is 0, OS takes an appropriate processing such as termination of the process. If M bit is 0, OS swaps in the page which contains the send area 120 from the external storage device 60, and restarts the transfer operation.

When the address translation unit 480 can duly access the address translation table information, it can calculate the real address of the send area 120 based on the information. As the data transfer which extends over pages is prohibited by hardware, the address translation unit 480 has to access the address translation table 140 only once for each transfer.

Next, the main storage access unit 400 issues a number of read requests which are dependent in number on a total amount of the send data, to the send area 120 through line a70, the address translation unit 480, line a65, the mixer 490, line a30, the main storage control unit 40, and line a40 to read the send data from the send area 120, and switches the output of switch 500 to the network send unit 430 through line c45. The send data read from the send area 120 is transmitted to the network send unit 430 through line d50, the main storage control unit 40, line d30, switch 500, and line d70.

Figure 7:
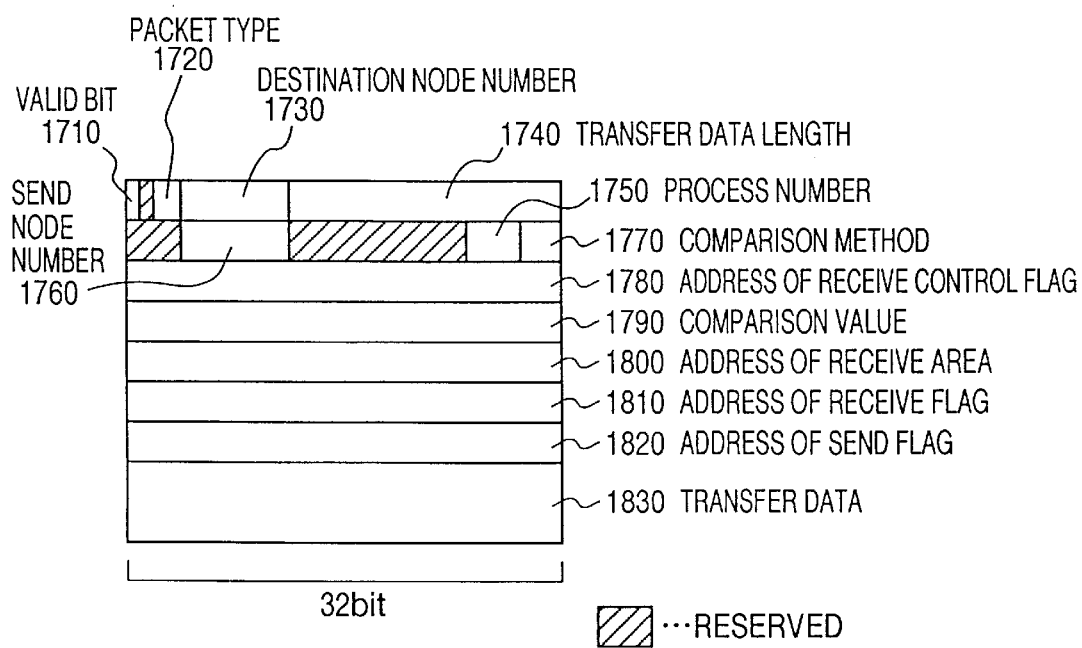
FIG. 7 shows information in the data transfer packet for the interprocessor network (1000) used in the apparatus of FIG. 1.

Network send unit 430 generates the packet shown in FIG. 7 from the read send data and the data in the send control register 70 having been previously sent from the send control unit 410, and sends out the packet to the interprocessor network 1000 through line c10.

In the packet format of FIG. 7, the valid bit 1710 is set to one (valid). Moreover, "00" indicative of data transfer is put in the packet type 1720. The value and the meanings of the packet type are shown in FIG. 11. The reply packet will be described later in section [5]. The interprocessor network 1000 transfers the sent out packet through line n20 to the network adaptor 230 of node 210 which becomes a destination node, based on the start information of the packet. The subsequent operation to the node 210 will be described in <2.2.3>.

[4] Renewal of Send Flag (2)

Send control unit 410 renews the send flag 110 to "0010" indicative of transfer completion according to the same procedure as in [2].

[5] Receipt of Storing Completion Notification and Renewal of the Send Flag (3)

When the destination node finished storing the send data in the main storage 50 (Refer to <2.2.3>), It returns the reply packet (Refer to FIG. 8) from the receive control unit 440. There are two kinds of reply packets used: (1) a reply packet with the packet type 1910 of "01" returned when the destination node has stored the send data in the receive area 340, and (2) a reply packet with the packet type 1010 of "01" returned when the destination node has stored the send data in the receive buffer 370. The operation of the destination node 210 for transfer of these packets will be explained in <2.2.3>.

When the network receive unit 450 in the network adaptor 10 of the send node 10 receives these packets from the interprocessor network 1000 through line n20, information in the packet is stored in the receive control register 170. FIG. 4 shows the composition of the receive control register. Data "O" is entered in the fields for which no available information is included in the packet, for example, data "O" goes into the field of the transfer data length 1350.

When the information in the packet is entered the receive control register 170, the receive control unit 440 requests the renewal of the send flag 110 in the main storage access unit 400 through line a60, based on the information. Send flag 110 is renewed as in [3]. The send flag 110 is renewed to "1010" for a packet of the packet type 1910 of "01". The send flag 110 is renewed to "0110" for a packet of the packet type 1910 of "10".

<2.2.3> Operation of Destination Node

[1] Start of Receive Operation

In the network adaptor 230 of the destination node, the receive operation is started, when the send data arrives at the interprocessor network 1000 the network receive unit 450. The start information (Refer to FIG. 7) of the received send data packet is stored in the receive control register 170 through line c65.

[2] Flag Checks

Receive control unit 440 is started according to information in the receive control register 170.

Receive control unit 440 issues an access request to the receive control flag 330, as in <2.2.2> [5], although there is a difference that the access operation this time is a read operation, while the operation in <2.2.2> [5] is a store operation. The data read from the receive control 330 passes through switch 500 in the network adaptor 230 and is stored in the receive control unit 440. The receive control unit 440 compares the semaphore value 2010 in the receive control flag 330 and the comparison value 1080 in the received packet by the method shown by the comparison method 1090 in the received packet (Refer to FIG. 10).

[3] Confirmation of Presence of the Receive Area 340 in the Main Storage 50

When the condition which the above-mentioned comparison method 1090 designates is fulfilled, in the above-mentioned comparison, the receive control unit 440 confirms whether the receive area 340 exists on the main storage 50. Specifically, the address translation unit 480 is used for this confirmation, as in the confirmation as to whether the send area 120 exists in the main storage 50 at start of the data transfer explained in <2.2.2> [3]. The difference is that address translation unit 480 interrupted CPU 20 through line c10 when the send area 120 was not on the main storage 50 in <2.2.2> [3], but in the present operation, the address translation unit 480 informs the receive control unit 440 of the non-existence of the receive area 340 on the main storage 50 through line c50, when the receive area 340 does not exist on the main storage 50. When the condition, which the above-mentioned comparison method 1090 designated, is not fulfilled in the above-mentioned comparison, the receive control unit 440 does not execute the confirmation of the existence of the receive area 340 in the main storage 50.

[4] Update of the Receive Flag (1)

The receive control unit 440 starts an operation for storing the send data in the receive area 340 on the main storage 50, when the receive control unit 440 has judged that the condition which the above-mentioned comparison method 1090 designates and at the same time when it has confirmed existence of the receive area 340 in the main storage 50. Otherwise, an operation to store the send data in the receive buffer 370 is started. Receive control unit 440 renews the receive flag 320 according to which of the two operations is executed, before executing one of these operations. This renewal is achieved by an operation similar to the send flag in <2.2.2>. The value of the flag after updating is 0001 or 0011 respectively indicative of the storing-to-receive-area state or the storing-to-buffer state, as shown in FIG. 13.

In addition, the number of buffered data field (2020 of FIG. 9) of the receive control flag 330 is counted-up when the send data is stored in the receive buffer 370 as a result of the comparison with the receive control flag 330. The number of buffered data is used as an aid in judging whether send data is stored in the receive buffer 370 when the program updates the semaphore value 2010. This count-up operation needs the same procedure as in updating of the other flag.

[5] Storing of send data in the main storage

The receive control unit 440 starts an operation for storing the send data into the receive buffer, when it judges that the condition shown by the comparison method 1090 is fulfilled, but that the receive area 340 does not exist in the main storage 50, or when it judges that the condition shown by the comparison method 1090 is not fulfilled.

That is, when the receive area 340 does not exist in the main storage 50, the send data can be effectively used, by storing the send data in the receive buffer 370, even if the receive area 340 is swapped out from the main storage.

The case where the condition which above-mentioned comparison method 1090 designates is not fulfilled occurs when the receive area 340 cannot be used for storing the send data because the receive area 340 is in use by the destination process or for any other reason.

In the present embodiment, the destination process is composed so as rewrite the semaphore 2010 according to the progress of the process, as described previously. If the condition which the comparison method 1090 is not fulfilled at receipt of the send data, the receive control unit 440 forces the send data to be stored in the receive buffer 370 without depending on the value of the comparison method 2770, and does not transfer the send data to the receive area 340. The send data will be translated from the receive buffer 370 to the receive area 340 later on. As a result, the overhead of synchronous processing necessary for transfer of data is reduced.

To start a store operation of the send data in the receive buffer 370, the receive control unit 440 issues the buffer store request to the buffer control unit 470 through line c70.

Buffer control unit 470 receives this request, checks the buffer control register 190, and finds the present store start address (the virtual address) from the current buffer address 1610. It further transfers this address to the main storage access unit 400 through line a80. When the main storage access unit 400 translates the virtual address into the real address, the process number "0000" is used in the translation, because the receive buffer exists in the OS area 130. The translating procedure needs to be the same as mentioned above, including means for fetching translating information from the address translation unit 480 and other means. The translated address is sent to the receive buffer 370 on the main storage through line a70, the address translation unit 480, line a65, and the mixer 490, etc. At the same time, the receive control unit 440 controls the network receive unit 450, so that the received packet is transferred from the network receive unit 450 to the receive buffer 370 through line c60, d90 and the mixer 460.

When the send data was transferred to the receive buffer 370, the buffer control unit 470 renews the current buffer address of the buffer control register 190 according to the transfer. When the current buffer address 1610 becomes larger than the buffer end address 1620 (which holds a value smaller than the true end of the buffer by an amount somewhat larger than 1MB, as mentioned before), the buffer control unit 470 interrupts the CPU through line c10. CPU secures new pages for the buffer, joins them to the buffer area already secured, so as to enlarge the receive buffer 370.

When the receive control unit 440 judges that the condition which the above-mentioned comparison method 1090 designates is satisfied in [2] above and judges that the receive area 340 exists in the main storage 50 in [3], the receive control unit 440 starts storing the send data in the receive area 340 on the main storage 50. That is, in this case, the receive area 340 has been swapped in the main storage 50, and the destination process has ceased to use it. So, the send data is stored in the receive area 340 at once. The store operation is executed in a similar way to the storing of the send data in the receive buffer 370. However, the process number used for the address translation is the process number of the send process included in the packet which has been transferred. Moreover, control information in the packet is removed and only the send data is stored unlike storing in the receive buffer 370 in the receive area 340.

[6] Update of Receive Flag (2)

After the storing into the main storage 50 completes, the receive flag 320 is updated. This updating can be executed by the operation similar to the update of the send flag at <2.2.2>. The value after updating is 0110 or 0100 indicative of the store-to-buffer-completed state or the receive-completion/storing-completion state, as shown in FIG. 13.

[7] Send Back of the Reply Packet

The reply packet (FIG. 8) is sent back so as to inform the send node 10 of completion of the storing into the main storage 50. For this send back, the receive control unit 440 sends the send control register 70 information necessary for generating the reply packet by way of line d65 and starts the send control register 70 by way of line c35.

The starting should follow a procedure similar to one adopted by CPU 20 at <2.2.2>.

[8] Movement of the Send Data from the Receive Buffer 370 to the Receive Area 340

In above-mentioned operation [5], the operation of the destination node ends when the send data can be stored in the receive area 340. However, when the send data was stored in the receive buffer 370, it is necessary to draw out the send data from the receive buffer 370 to the receive area 340 at an appropriate time. Because the receive buffer exists in the OS control area, only OS can draw out the send data. The draw out timing varies depending upon a situation where the send data was transferred to the receive buffer 370. The timing will be explained below.

(1) When the receive area 340 does not exist in the main storage 50 at receipt of the send data.

In this case, the send data is moved from the receive buffer 370 to the receive area 340, when the destination process issues a main storage read instruction (for example, load instruction) which requests readout of data included in the page which contains the receive area 340.

When CPU 20 executes this instruction, the page fault is generated in this case in the process to translate the virtual address designated by this instruction into the real address. The send data is moved from the receive buffer 370 to the receive area 340 in processing of this page fault. Control is switched to OS at generation of this page fault. In the present embodiment, the routine for executing the page fault processing like FIG. 23 is provided in OS. That is, after preparing empty pages corresponding to the page fault, this routine checks with respect to all of the receive buffers 370 whether the data of the page which the instruction requests exists in one of the receive buffers 370 (step 4020).

The data stored in the receive buffer 370 remains in a form which contains the packet header information. OS can check if the stored data is data of the requested page by using this information. When the data of this page does not exist in any receive buffer 370, the page is swapped in from the external storage device 60 (step 4030). When the entire data of the requested page exists in the receive buffer 370, the data of this page in the receive buffer 370 is memory copied to the receive area 340 (4060) without executing any swap in. The valid bit 1710 of the packet header for the data drawn out data is changed to O (invalid), so that the data is disregarded in subsequent searching. If appropriate, it is possible not to memory-copy the data but to assign a real address to the location of the data in the receive buffer 340, so that the data in the receive buffer 340 can be accessed later by the virtual address designated by the above mentioned instruction. After the above-mentioned processing ends, the address translation table 140 is renewed so that M bit 2630 (FIG. 18) related to the page within the address translation table 140 is set to "1" (step 4070). Thus, the send data can be drawn out from the receive buffer 370 at occurrence of the page fault.

In the data transfer of the prior art usual SEND/RECEIVE type, the data is drawn out from the receive buffer only when the RECEIVE instruction is executed, that is, only when the user process explicitly requests the OS to draw out the data. In the present embodiment which uses the data transfer of the PUT type, however, the drawing out operation of the send data can be started when the user process of the destination node just issues a data read instruction such as a load instruction. This is because, in the present system which adopts the PUT type data transfer, the destination process can access the receive area, without knowing whether the send data has been stored in the receive area. Moreover, in the data transfer of the prior art usual SEND/RECEIVE type, when the user process requests the send data, OS searches the receive buffer to detect whether the requested send data exists in the receive buffer. If the data exists in the receive buffer, OS detects whether the page to which the send data should be transferred exists in the main storage. In the present embodiment, however, when the user process issues a data reading instruction and a page fault is generated, OS detects whether the page to which the data requested by this instruction belongs exists in the receive buffer. In this respect, too, the procedure for using the send data in the present embodiment is different from that in the data transfer the prior art usual SEND/RECEIVE type.

(2) When the semaphore 2010 does not fulfill the condition designated by the tranfer instruction at receipt of the send data.

This case occurs when the user process of the destination node has not ceased using the receive area 340 at receipt of the send data.

In this case, the user process of the destination node searches for the reeive flag 320 and detects whether the data has already been transferred to the receive buffer 370, when the user process uses the send data which should be stored in the receive area 340 after it has ceased to use the receive area 340. The user process issues the system call to request the send data to be drawn out from the receive buffer 370 to the receive area 340, when the user process detects that the send data has been transferred to the receive buffer 370. The user process can read the receive flag to determine the status of receiving of the send data by designating the receive flag to read. OS responds to this system call and executes this drawing out. The processing executed at this time was already explained by using the specific programs shown in FIG. 22. In the program, the system call is GETBUF instruction. The If sentence included in the program generates a read instruction to the receive flag.

When the receive area is not present in the main memory at receipt of the send data and at the same time the send data does not satisfy the condition mentioned above, the send data can be transferred from the buffer area to the receive area, when either one of the memory access instruction and the system call is executed.

(3) The send data can be moved in other cases.

When the user process updates the semaphore value 2010 in the receive control flag 330, the user process may desire that all of the send data held in the receive buffer 370 received for an old semaphore 2010 be moved to the receive area 340. The user process may issue the system call, and OS moves all the above-mentioned send data.

[9] Send Back of the Reply Packet Corresponding to Arrival Completion

When moving the send data from the receive buffer 370 to the receive area 340 mentioned in [8] above, the operation similar to that in the transferring operation in <2.2.2> is executed and a reply packet (the receive acknowledge) can be transferred by storing "01" in the transfer start field 1020 of the send control register 70, unlike the operation at transfer of the data transfer packet. If desired, when "10" is stored instead of "01" above, the buffering acknowledge packet can be sent by software control.

In view of the detailed explanation, it will be clear that the program illustrated in FIG. 22 is executed in a manner explained before. As a result, the PUT instruction can be executed even if the receive area is not fixed in the main storage, as explained previously. In addition, it is easy to synchronize between the send node and the destination node.

<3> Modifications

The present invention is not limited to above-mentioned the embodiment but covers a variety of modifications. The following is one of those modifications. The following modified operations can be realized without changing the structure of the hardware of the above-mentioned embodiment. In the following explanation, only those portions different from the embodiment disclosed above will be mainly explained.

<3.1> Basic Concept of the Modification

The user program controls the value of the receive control flag. Therefore, it is indispensable that the user program can know whether the send date has been buffered in the receive buffer 370 due to a specific value of the receive control flag. However, whether the receive area 340 exists on the main storage is beyond the control by OS. That is, it is not necessary to inform the user program by the send flag and the receive flag that the send data has been buffered because the receive area 340 does not exist on the main storage.

<3.2> Basic Points of the Modification

In the embodiment explained in <1.4>, either a flag value "0011" (FIG. 13) indicative of the storing-in-receive-buffer state or of a flag value "0110" indicative of the control flag "rb" in each of the following two cases, when the send data is stored in the receive buffer: (1) the send data is stored into the receive buffer 370, because it turns out that the comparison condition 2770 designated by the PUT instruction 3120A (FIG. 22) is not satisfied as a result of the comparison of the comparison value 2760 designated by the PUT instruction and the receive control flag "b", and (2) the receive area has been swapped out.

In the present modification, however, writing of the flag "0011" or "0110" is limited to the first one of the two cases. If it has been judged that the comparison value designated by the receive area is not present in the main memory, this case is treated as the first case in the present modification.

When the second case occurred, a flag value of "0001" indicative of the storing-to-receive area" or a flag value "0100" indicative of the storing-to-receive-area-completed state is written in the receive flag "rb". It is quite the same with the processing of the PUT instruction 3120B (FIG. 22). Regarding the send node, a flag value "0110" indicative of the send-completed/store-to-receive-area-completed state is written in the send flat "sa". The change of the flag value written in the send flag "sa" is attained by changing a value included in the reply packet to be sent to the send node. So, only change of the operation of the destination node is enough to realize the present modification <3.3> Change of the Program Operation of the Destination Node When the program shown in FIG. 22 is executed in the present modification, it occurs that the send data is stored into in the receive buffer 370 because the receive area 340 was swapped out, although the value of the receive control flag "b" or "a" fulfills condition designated by the PUT instruction 3120A or 3120B, respectively. In that case, the value of the receive control flag "b" or "a" has a value of "0100"=RFIN. Therefore, the GETBUF instruction in the IF sentence in the instruction series 3150A or 3150B is not executed, and therefore, the send data in the receive buffer 370 is not transferred to the receive area by this system call in the case presently presumed. The data transfer, however, occurs in the present modification when the READ instruction 3160A or 3160B is executed, because a page fault is generated and OS transfers the send data from the receive buffer to the receive area in a course of processing of the page fault.

To be more specific, the operation of the destination node needs to be changed about the following four points.

A) In renewal (1) of the receive flag explained in <2.2.3> [4], the flag value "0001" indicative of the storing-to-receive-area state is stored in the receive flag "ra" or "rb", even when the send data is stored in the corresponding receive buffer 370, because the receive area 340 has been swapped out.

B) In renewal (2) of the receive flag shown in <2.2.3> [6], the flag value "0100" indicative of the store-to-receive-area-completed as stored in the receive flag "ra" or "rb", even when the send data was stored in the corresponding receive buffer, because the receive area has been swapped out.

C) In send back of the replay packet explained in <2.2.3> [7], a value "01" indicative of the receive acknowledgment is attached to the reply packet, even when the send data was stored in the receive buffer 370 because the receive area 340 has been swapped out.

D) In send back of the replay packet indicative of the receive completion explained in <2.2.3> [8], the reply packet is sent back when the send data has been drawing out from the receive buffer 370 by execution of the GETBUF function, but it will not be necessary to send back the reply packet when the send data has been drawing out at execution of the READ instruction.

The movement of the send data from the receive buffer to the receive area in the real memory at occurrence of a page fault mentioned above is not limited to when the page fault was generated at execution of a data read instruction. The same operation mentioned is executed when a page fault is generated at execution of a memory access instruction in general which requests an access to the receive area. Such a memory access instruction includes a memory store instruction which requires storing of data into the receive area. The fact that the movement of the send data is executed for a memory access instruction in general is not limited to the present modification but true even with the embodiment explained before.

As is clear from the explanation above, the present invention enables the PUT type data transfer be executed, even if the receive area is not fixed in the real storage.

Also, the present invention enables the PUT type data transfer be executed with less overhead for synchronization between the send node and the receive node.

As set forth above, many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A data transfer method in a computer system comprised of a plurality of nodes connected to each other by a data transfer network, wherein each node includes at least one processor and a main storage, said method comprising the steps of:

sending, from a send node to a destination node, data and a virtual address of a receive area which stores the data in the destination node;

the destination node storing the data in the receive area to which the virtual address is allocated, when the receive area exists in a main storage of the destination node at receipt of the data;

the destination node storing the data into a buffer area provided in the destination node for temporary storage, when the receive area does not exist in the main storage of the destination node at receipt of the data; and the destination node transferring the data stored in the buffer area to the receive area in the main storage of the destination node during subsequent execution of a predetermined instruction issued by a user program being executed by the destination node after the data has been stored in the buffer area, the transferring being executed after allocating the receive area to the main storage.

2. A data transfer method according to claim 1, wherein the predetermined instruction is a memory access instruction which requires access to the receive area.

3. A data transfer method according to claim 2, wherein the transferring step comprises the steps of:

executing page fault processing in response to a page fault which is generated as a result of execution of the memory access instruction when the receive area is not present in the main storage;

executing the allocating in the page fault processing; and moving the data from the buffer area to the receive area allocated in the main storage.

4. A data transfer method according to claim 1, wherein the predetermined instruction is a predetermined system call to an operating system which controls the destination node.

5. A data transfer method according to claim 1, wherein the transferring is executed by an operation system which controls the destination node;

wherein the two storing steps are executed at receipt of the data from the network by a circuit provided in said destination node and connected to the processor of the destination node, to the main storage thereof, and to the network.

6. A data transfer method according to claim 1, further comprising a step of storing a receive flag in an area accessible by a user program in the main storage of the destination node;

wherein the receive flag indicates a receiving status of the data at the destination node;

wherein the receive flag has first and second values when the data has been stored in the buffer area and in the receive area, respectively.

7. A data transfer method in a computer system comprised of a plurality of nodes connected to each other by a data transfer network, wherein each node includes at least one processor and a main storage, said method comprising the steps of:

sending, from a send node to a destination node, data, a virtual address of a receive area which stores the data in the destination node, and a comparison value;

the destination node storing a semaphore value designated by a user program being executed by the destination node;

the destination node detecting whether the comparison value sent from the send node and the stored semaphore value satisfy a predetermined condition so as to allow the data to be written in a receive area with the virtual address allocated;

the destination node storing the data in a buffer area provided in the destination node for temporary storage, when it is determined that the predetermined condition has not been satisfied; and the destination node transferring the data from the buffer area to the receive area in response to a transfer request subsequently issued by the program.

8. A data transfer method according to claim 7, wherein the semaphore is held in the main storage of the destination node at a location accessible by a user program and an address of the location is sent from the send node together with the data.

9. A data transfer method according to claim 7, further comprising a step of storing a receive flag in an area accessible by a user program in the main storage of the destination node;

wherein the receive flag indicates a receiving status of the data at the destination node;

wherein the receive flag has first and second values when the data has been stored in the buffer area and in the receive area, respectively.

10. A data transfer method according to claim 9, wherein an address of a location where the receive flag is held is sent from the send node together with the data.

11. A data transfer method according to claim 9, further comprising the steps of:

the destination node informing the send node of receive status information indicative of progress of receiving the data at the destination node, the receiving status information indicating at least whether the data has been stored in the receive area or in the buffer area; and the send node storing a send flag in an area accessible by a user program in the main storage of the send node, in response to the receiving status information informed by the destination node, wherein the send flag has first and second values when the data has been stored in the buffer area and in the receive area, respectively.

12. A data transfer method according to claim 11, wherein the semaphore is held in the main storage of the destination node at a location accessible by a user program;

wherein an address of the location where the semaphore is held, an address of a location where the receive flag is held, and an address of a location in the main storage of the send node where the send flag is held are sent from the send node together with the data;

wherein the informing step includes a step of informing the send node of the address of the send flag as sent from the send node.

13. A data transfer method according to claim 7, further comprising the steps of:

the destination node informing the send node of receive status information indicative of progress of receiving of the data at the destination node, the receiving status information indicating at least whether the data has been stored in the receive area or in the buffer area; and the send node storing a send flag in an area accessible by a user program in the main storage of the send node, in response to the receiving status information informed by the destination node;

wherein the send flag has first and second values when the data has been stored in the buffer area and in the receive area, respectively.

14. A data transfer method according to claim 7, further comprising the steps of:

the destination node detecting whether the receive area with the virtual address allocated exists in a main storage of the destination node at receipt of the data;

the destination node storing the data into the buffer area either when it is detected by the detecting step related to the receive area that the receive area is not present in the main storage of the destination node or when it is judged by the detecting step related to the condition that the condition has not been satisfied;

wherein the step of storing the data in the receive area is executed when it is detected by the detecting step related to the receive area that the receive area is present in the main storage of the destination node, and at the same time it is judged by the detecting step relating to the condition that the condition has been satisfied.

15. A data transfer method according to claim 14, further comprising a step of storing a receive flag in an area accessible by a user program in the main storage of the destination node, wherein the receive flag indicates a receive status of the data at the destination node.

16. A data transfer method according to claim 15, wherein the receive flag has first and second values when the data has been stored in the buffer area and in the receive area, respectively.

17. A data transfer method according to claim 15, wherein the receive flag has a first value when the data has been stored in the buffer area when the condition has not satisfied, irrespective of whether the receive area is present in the main storage of the destination node;

wherein the receive flag has a second value either when the data has been stored in the receive area because the receive area is present in the main storage of the destination node and at the same time the condition has been satisfied, or when the condition has been satisfied but the receive area is not present in the main storage of the destination node.

18. A data transfer method according to claim 15, wherein an address of a location where the receive flag is held is sent from the send node together with the data.

19. A data transfer method according to claim 15, further comprising the steps of:

the destination node informing the send node of receive status information indicative progress of receiving of the data at the destination node, the receiving status information indicating at least whether the data has been stored in the receive area or in the buffer area; and the send node storing a send flag in an area accessible by a user program in the main storage of the send node, in response to the receiving status information informed by the destination node.

20. A data transfer method according to claim 19, wherein the send flag has first and second values when the data has been stored in the buffer area and in the receive area, respectively.

21. A data transfer method according to claim 19, wherein the send flag has a first value when the data has been stored in the buffer area when the condition has not been satisfied, irrespective of whether the receive area is present in the main storage of the destination node;

wherein the send flag has a second value either when the data has been stored in the receive area because the receive area is present in the main storage of the destination node and at the same time the condition has been satisfied, or when the condition has been satisfied but the receive area is not present in the main storage of the destination node.

22. A data transfer method according to claim 19, wherein the semaphore is held in the main storage of the destination node at a location accessible by a user program;

wherein an address of the location where the semaphore is held, an address of a location where the receive flag is held, and an address of a location in the main storage of the send node where the send flag is held are sent from the send node together with the data;

wherein the informing step includes a step of informing the send node of the address of the send flag as sent from the send node.

23. A computer system, comprising:

a plurality of nodes; and a data transfer network for connecting the plurality of nodes with each other;

wherein each node includes:
  at least one processor,
  a main storage connected to the processor, and
  a network adaptor connected to the main storage, the processor and the network;

wherein the network adaptor within each node includes:
  a send unit connected to the processor and the network for sending one of the plurality of nodes, by way of the network, data and a virtual address of a receive area within the one node,
  a receive unit connected to the network for receiving from the one node, by way of the network, data, and a virtual address of a receive area within each node,
  an address translation unit connected to the main storage of each node for translating the virtual address received by the receive unit into a corresponding real address of a real page allocated with the virtual address, and generating a page fault signal when the real page is not present in the main storage of each node, and
  a control connected to the address translation unit and the main storage of each node and for causing the data received by the receive unit to be written into the real page in response to the real address obtained by the address translation unit when the real page is present in the main storage and for causing the data to be stored in a buffer area predetermined in the main storage of each node, when the real page is not present in the main storage of each node; and wherein the processor is programmed to allocate a real page in the main storage to the virtual address, in response to a request issued by a user program being executed by the processor after the data has been stored in the buffer area by said control unit, when a real page with the virtual address allocated is not present therein at receipt of the data, and to transfer the data from the buffer area to the real page after allocated therein.

24. A computer system according to claim 23, wherein the request is a memory access request, and the processor is programmed to allocate a real page to the virtual address in case of page fault processing which deals with a page fault signal generated by the address translation unit at execution of the memory access request, and to transfer the data from the buffer area to the real page which has been allocated with the virtual address.

25. A computer system according to claim 23, wherein the request is a system call to an operating system of each node, and the processor is programmed to allocate a real page to the virtual address in case of processing of the system call by the operating system and to transfer the data from the buffer area to the real page which has been allocated with the virtual address.

26. A computer system, comprising:

a plurality of nodes; and a data transfer network for connecting the plurality of nodes with each other;

wherein each node includes:
  at least one processor,
  a main storage connected to the processor, and
  a network adaptor connected to the main storage, the processor and the network;

wherein the network adaptor within each node includes:
  a send unit connected to the processor and the network for sending one of the plurality of nodes by way of the network, data, a virtual address of a receive area within the one node, a comparison value for the data which are designated by a program being executed by the processor of each node,
  a receive unit for receiving from the one node, data, a virtual address of a receive area in the main storage of each node, and a comparison value for the data received,
  an address translation unit connected to the main storage of each node for translating the received virtual address into a corresponding real address of a real page in the main storage of each node, and
  a receive control unit connected to the receive unit, the address translation unit and the main storage of the each node, for judging whether the received comparison value satisfies a predetermined condition based upon a semaphore value predetermined by the program being executed by each node, and for causing the data received by the receive unit to be written into a receive area having the real address obtained by the address translation unit for the received virtual address, when the condition has been satisfied and for causing the received data to be written in a buffer area predetermined in the main storage of each node, when it has been judged that the condition has not been satisfied.

27. A computer system according to claim 26, wherein the receive control further causes a receive flag to be stored in an area within the main storage accessible by the program being executed by each node;

wherein the receive flag indicates a receive status of the data at the destination node; and wherein the receive flag has first and second values when the data has been stored in the buffer area and in the receive area, respectively.

28. A computer system according to claim 26, wherein the processor is programmed to transfer the data from the buffer area to the receive area in the main storage, in response to a request issued by the program being executed by the processor, the request being issued after the received data has been written into the buffer area when the condition has not been satisfied at receipt of the data.

* * * * *